(12) United States Patent
Katz et al.

(10) Patent No.: US 11,924,044 B2
(45) Date of Patent: *Mar. 5, 2024

(54) ORGANIZING EXECUTION OF DISTRIBUTED OPERATING SYSTEMS FOR NETWORK DEVICES

(71) Applicant: Juniper Networks, Inc., Sunnyvale, CA (US)

(72) Inventors: David M. Katz, Santa Cruz, CA (US); Ross W. Callon, Westford, MA (US); Scott Mackie, Santa Cruz, CA (US); Dennis C. Ferguson, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,353

(22) Filed: Mar. 24, 2022

(65) Prior Publication Data

US 2022/0217053 A1 Jul. 7, 2022

Related U.S. Application Data

(63) Continuation of application No. 15/637,809, filed on Jun. 29, 2017, now Pat. No. 11,316,744.

(Continued)

(51) Int. Cl.
*H04L 41/12* (2022.01)
*G06F 9/48* (2006.01)
(Continued)

(52) U.S. Cl.
CPC ............ *H04L 41/12* (2013.01); *G06F 9/4843* (2013.01); *G06F 9/5061* (2013.01);
(Continued)

(58) Field of Classification Search
CPC ......... H04L 41/12; H04L 45/48; H04L 45/02; H04L 41/0668; H04L 43/16; H04L 45/22;
(Continued)

(56) References Cited

U.S. PATENT DOCUMENTS 5,968,122 A 10/1999 Schlosser et al.
6,721,880 B1 4/2004 Pike
(Continued)

FOREIGN PATENT DOCUMENTS

CN 1881945 A 12/2006
CN 101136730 A 3/2008
(Continued)

OTHER PUBLICATIONS

"Introducing Microsoft Cluster Service (MSCS) in the Windows Server 2003 Family" Microsoft Docs, Nov. 2002, updated Sep. 9, 2006, 17 pp.

(Continued)

*Primary Examiner* — Emmanuel L Moise
*Assistant Examiner* — Zia Khurshid
(74) *Attorney, Agent, or Firm* — Shumaker & Sieffert, P.A.

(57) ABSTRACT

In general, techniques are described for organizing execution of distributed operating systems for network devices. A device comprising hardware computing nodes may be configured to perform the techniques. The hardware computing nodes may execute a protocol by which to discover a topology of the plurality of hardware computing nodes, and determine, based on the topology, a subset of the plurality of hardware computing nodes to manage execution of a distributed operating system. The determined subset of the plurality of hardware computing nodes may execute a communication bus by which to synchronize operating system state information between the subset of the plurality of (Continued)

hardware computing nodes. The hardware computing nodes may further execute, based on the operating system state information, the distributed operating system to provide an execution environment in which one or more applications execute.

17 Claims, 14 Drawing Sheets

Related U.S. Application Data

(60) Provisional application No. 62/479,804, filed on Mar. 31, 2017, provisional application No. 62/437,369, filed on Dec. 21, 2016.

(51) Int. Cl.
  *G06F 9/50* (2006.01)
  *G06F 11/20* (2006.01)
  *H04L 45/02* (2022.01)
  *H04L 45/48* (2022.01)

(52) U.S. Cl.
  CPC ......... *G06F 11/2097* (2013.01); *H04L 45/02* (2013.01); *H04L 45/48* (2013.01); *G06F 11/2023* (2013.01); *G06F 2201/81* (2013.01)

(58) Field of Classification Search
  CPC ....... H04L 45/32; H04L 45/38; G06F 9/5061; G06F 11/2097; G06F 9/4843; G06F 2201/81; G06F 11/2023
  USPC ........................................ 709/223
  See application file for complete search history.

(56) References Cited

U.S. PATENT DOCUMENTS

| | | |
|---|---|---|
| 6,792,461 B1 | 9/2004 | Hericourt |
| 6,876,625 B1 | 4/2005 | McAllister et al. |
| 6,965,936 B1 | 11/2005 | Wipfel et al. |
| 6,986,076 B1 | 1/2006 | Smith |
| 7,275,081 B1 | 9/2007 | Katz et al. |
| 7,518,986 B1 | 4/2009 | Chadalavada et al. |
| 7,702,640 B1 | 4/2010 | Vermeulen et al. |
| 7,739,403 B1 | 6/2010 | Balakrishna et al. |
| 7,917,578 B1 | 3/2011 | Katz et al. |
| 8,224,935 B1 | 7/2012 | Bandopadhyay et al. |
| 8,798,055 B1 | 8/2014 | An |
| 9,244,994 B1 | 1/2016 | Adoc et al. |
| 9,418,131 B1 | 8/2016 | Halevi et al. |
| 9,424,140 B1* | 8/2016 | Madhavarapu ..... G06F 11/0751 |
| 9,497,160 B1 | 11/2016 | Diffie et al. |
| 10,015,264 B2 | 7/2018 | Lancaster et al. |
| 10,104,039 B1 | 10/2018 | Knecht et al. |
| 10,182,105 B2 | 1/2019 | Srinivasan et al. |
| 10,552,442 B1 | 2/2020 | Lusk et al. |
| 10,887,173 B2 | 1/2021 | Katz et al. |
| 11,075,806 B1 | 7/2021 | Srinivasan et al. |
| 11,095,742 B2 | 8/2021 | Chandra et al. |
| 11,265,216 B2 | 3/2022 | Katz et al. |
| 2002/0083073 A1 | 6/2002 | Vaidya et al. |
| 2002/0161889 A1 | 10/2002 | Gamache et al. |
| 2003/0055892 A1 | 3/2003 | Huitema et al. |
| 2004/0220979 A1 | 11/2004 | Young et al. |
| 2005/0013310 A1* | 1/2005 | Banker ............... H04L 41/0213 370/467 |
| 2005/0240644 A1 | 10/2005 | Van Berkel et al. |
| 2006/0059287 A1 | 3/2006 | Rivard et al. |
| 2006/0067210 A1 | 3/2006 | Liu et al. |
| 2006/0277284 A1 | 12/2006 | Boyd |
| 2008/0288747 A1* | 11/2008 | Inglett ................ G06F 9/5061 712/20 |
| 2008/0294732 A1 | 11/2008 | Fletcher et al. |
| 2009/0077269 A1 | 3/2009 | Goldstein et al. |
| 2009/0138757 A1 | 5/2009 | Matsumoto et al. |
| 2010/0128638 A1 | 5/2010 | Navas et al. |
| 2010/0257149 A1 | 10/2010 | Cognigni et al. |
| 2010/0309933 A1 | 12/2010 | Stark et al. |
| 2011/0013508 A1 | 1/2011 | Tuplur et al. |
| 2011/0090787 A1 | 4/2011 | Smith et al. |
| 2011/0099266 A1 | 4/2011 | Calder et al. |
| 2011/0238793 A1 | 9/2011 | Bedare et al. |
| 2012/0266024 A1 | 10/2012 | Jackson |
| 2013/0232545 A1 | 9/2013 | Ma et al. |
| 2013/0282920 A1 | 10/2013 | Zhang et al. |
| 2013/0318571 A1 | 11/2013 | Radzikowski et al. |
| 2014/0115137 A1* | 4/2014 | Keisam .............. H04L 41/04 709/223 |
| 2014/0165015 A1 | 6/2014 | Baumgartner et al. |
| 2014/0188794 A1 | 7/2014 | Dalton |
| 2015/0248448 A1 | 9/2015 | Tsirkin |
| 2015/0278030 A1 | 10/2015 | Zhu |
| 2016/0191611 A1 | 6/2016 | Srinivasan et al. |
| 2016/0191613 A1 | 6/2016 | Srinivasan et al. |
| 2016/0285678 A1 | 9/2016 | Rath et al. |
| 2016/0328463 A1 | 11/2016 | Adoc et al. |
| 2017/0214738 A1* | 7/2017 | Agarwal ............... H04L 47/125 |
| 2017/0302502 A1* | 10/2017 | Feng ..................... G06F 11/14 |
| 2018/0176082 A1 | 6/2018 | Katz et al. |
| 2018/0176093 A1 | 6/2018 | Katz et al. |
| 2018/0176120 A1 | 6/2018 | Katz et al. |
| 2021/0249912 A1 | 8/2021 | Glover |
| 2021/0263931 A1 | 8/2021 | Gupta et al. |
| 2021/0272287 A1 | 9/2021 | Neumann et al. |

FOREIGN PATENT DOCUMENTS

| | | |
|---|---|---|
| CN | 101308513 A | 11/2008 |
| CN | 102202073 A | 9/2011 |
| CN | 102202104 A | 9/2011 |
| CN | 103379129 A | 10/2013 |
| CN | 103902617 A | 7/2014 |
| CN | 105743692 A | 7/2016 |
| EP | 1117040 A2 | 7/2001 |
| EP | 1117040 A3 | 10/2005 |
| EP | 1793542 A2 | 6/2007 |
| EP | 1793542 A3 | 7/2010 |
| EP | 2771789 A1 | 9/2014 |
| EP | 2919130 A1 | 9/2015 |
| EP | 2930902 A2 | 10/2015 |
| EP | 2930902 A3 | 10/2015 |
| EP | 3128720 A1 | 2/2017 |
| EP | 3340055 A1 | 6/2018 |
| WO | 2001014948 A2 | 3/2001 |
| WO | 2015036791 A1 | 3/2015 |
| WO | 2016106682 A1 | 7/2016 |

OTHER PUBLICATIONS

"Junos XML Management Protocol Developer Guide," Junos OS, Juniper Networks, Inc., Feb. 14, 2019, 426 pp.

REST API Guide Junos OS, Juniper Networks, Inc., Aug. 21, 2018, 50 pp.

Communication pursuant to Article 94(3) EPC dated Apr. 22, 2021 in EP counterpart application No. 17204477.8, 14 pp.

Extended Search Report from counterpart European Application No. 17204477.8, dated May 16, 2018, 13 pp.

First Office Action and Search Report, and translation thereof, from counterpart Chinese Application No. 201711232221.1, dated Jun. 9, 2020, 18 pp.

Prosecution History from U.S. Appl. No. 15/637,809, dated Mar. 7, 2019 through Mar. 23, 2022, 255 pp.

Prosecution History from U.S. Appl. No. 15/637,839, dated May 16, 2019 through Apr. 1, 2022, 142 pp.

Response to Communication pursuant to Article 94(3) EPC dated Apr. 22, 2021 in EP counterpart application No. 17204477.8, filed Aug. 17, 2021, 15 pp.

Response to Extended Search Report dated May 16, 2018, from counterpart European Application No. 17204477.8, filed Dec. 20, 2018, 30 pp.

(56) References Cited

OTHER PUBLICATIONS

Summons to Attend Oral Proceedings Pursuant to Rule 115(1) EPC from counterpart European Application No. 17204477.8 dated Mar. 25, 2022, 18 pp.
First Auxiliary from European Patent Application No. 17204477.8 filed Sep. 1, 2022, 8 pp.
Response to Summons to Attend Oral Proceedings pursuant to Rule 115(1) EPC dated Mar. 25, 2022, including Main Request, from European Patent Application No. 17204477.8] filed Sep. 1, 2022, 21 pp.
Second Auxiliary from European Patent Application No. 17204477.8 filed Sep. 1, 2022, 10 pp.
Notice of Intent to Grant and Text Intended to Grant from counterpart European Application No. 17204477.8 dated Dec. 2, 2022, 84 pp.

\* cited by examiner

ORGANIZING EXECUTION OF DISTRIBUTED OPERATING SYSTEMS FOR NETWORK DEVICES

This application is a continuation of U.S. patent application Ser. No. 15/637,809, filed 29 Jun. 2017, which claims the benefit of U.S. Provisional Patent Application No. 62/479,804, filed 31 Mar. 2017; U.S. patent application Ser. No. 15/637,809, filed 29 Jun. 2017, claims the benefit of U.S. Provisional Patent Application No. 62/437,369, filed 21 Dec. 2016, the entire content of each application is incorporated herein by reference.

TECHNICAL FIELD

The invention relates to network devices and, more particularly, to operating systems for network devices.

BACKGROUND

Operating systems for network devices, such as routers, function to provide an execution environment in which various applications (such as network protocols, maintenance interfaces, virtualization applications, etc.) may execute. One function of the operating system of a router is to establish a way by which state information may be propagated to the various components or, in other words, computing nodes of the router to allow the router to correctly route network traffic within a network.

A router may, for example, maintain state information representing the current state of the interfaces between the router and the network. Such state information may include information representing the state of one or more IFCs, such as the current configuration of the IFCs. As additional examples, a router may maintain state information representing the state of one or more packet forwarding engines (PFEs), one or more routing engines, or other resources within the router.

A control node referred to as a "routing engine" operating within the router may execute an instance of the operating system to propagate the state information (and changes thereto) to various other processes or components within the router. These other processes or components are sometimes referred to as "consumers," because they receive and utilize (or, in other words, "consume") the state information maintained by the instance of the operating system. These consumers make use of the state information when performing their various functions.

As the complexity of conventional networks has increased in recent years, management of the state information within a router or other network device has likewise become a significant challenge. Some existing methods for managing state information involve caching the information within the instance of the operating system, and issuing state update notification messages to consumers executing within the router. In response, the consumers retrieve the state information from the instance of the operating system.

To increase reliability, some routers may include a primary routing engine and one or more standby routing engines, each of which may execute a separate and distinct instance of the operating system to manage the state information. In the event that the primary routing engine fails, one of the standby routing engines assumes control of the routing resources to continue operation of the router. The process of switching control of routing functions between the primary and standby routing engines is often referred to as failover. In some instances, to assume proper control and ensure operation, the standby routing engine is forced to "relearn" the lost state information from each resource, e.g., by power cycling the router resources to a known state. This causes an interruption in packet forwarding while the router resources restart operations as the instance of the operating system executed by the standby routing engines rebuilds the correct state information.

Routers have not only developed to be more reliable, but also to meet increasing bandwidth demands. One way to meet increasing bandwidth needs is to use multi-chassis routers, i.e., routers in which multiple routing devices are physically coupled and configured to operate as a single router. For example, a multi-chassis router may contain multiple line card chassis (LCCs), which include one or more IFCs, and a central switch card chassis (SCC), which forward packets between the LCCs and provides top-down management of the multi-chassis router. Because multi-chassis routers combine resources of multiple routing devices, multi-chassis routers typically have much higher bandwidth capabilities than standalone routers. The use of multi-chassis routers can simplify and improve routing on a service provider network by consolidating routing functions onto fewer routers.

However, multi-chassis routers may result in a large number of different components (such as routing engines) each executing a different instance of the operating system that is required to correctly maintain the state information and communicate changes to the state information to downstream consumers. That is, the multi-chassis router may include, in addition to multiple routing engines that each execute a different instance of the operating system, SCCs and LCCs that also include control nodes that execute yet another instance of the operating system, all of which require at least some portion of the state information and propagation of the state information to some if not all of the various consumers.

SUMMARY

Techniques are described for providing a distributed operating system for network devices that may allow for dynamic expansion or contraction (or, in other words, "elasticity") of underlying hardware resources while also potentially providing robust convergence of state information across producing components (so-called "producers") and consuming components (so-called "consumers"). The operating system may be distributed across computing nodes (which may also be referred to as "hardware computing nodes," "computing nodes" or "nodes"), which may include routing engines, interface cards, packet forwarding engines, as well as non-networking nodes, such as processors, central processing units (CPUs), application specific integrated circuits (ASICs), graphical processing units (GPUs). The computing nodes may initially coalesce, starting from a kernel, detecting one another via an object flooding protocol (OFP) premised upon topology discovery similar to link state routing protocols, and organizing via a management process (referred to as "SysEpochMan") to execute the distributed operating system.

The distributed operating system may, once booted across the computing nodes, allow for real-time (or, near-real-time) construction of a synchronization tree for synchronizing databases of state information maintained by the distributed operating system. The operating system may synchronize the databases using OFP, while also potentially pruning the databases and reducing bandwidth requirements. The operating system may handle coherence among the computing nodes executing instances of the distributed operating system using a systematic process, referred to as a "system epoch" so that coherent state information may be maintained by each instance in the event of various connectivity or failures of the instances of the distributed operating system.

The distributed operating system may avoid redundant execution of separate instances of the same operating system, while simplifying propagation of state information by way of flooding in the form of multicast delivery of state information. Furthermore, the distributed operating system may be resilient to computing node failure allowing for individual computing nodes supporting the distributed operating system to fail without requiring the reboot of the remaining computing nodes supporting execution of the single instance of the distributed operating system.

Computing nodes of a network device executing respective instances of the distributed operating system may be configured to store state information in respective data structures, such as tree data structures. The computing nodes of the network device may represent the state information as message fragments, where each message fragment is stored in a tree node of the tree data structure. Furthermore, the computing nodes of the network device may synchronize the tree data structures using OFP, by flooding objects representative of the message fragments to the other computing nodes. For example, when one of the computing nodes of the network device receives updated state information, the one of the computing nodes of the network device may update its local tree data structure, then flood the updated state information to the other computing nodes of the network device in accordance with OFP. In this manner, the computing nodes can maintain synchronization between their respective data structures for storing state information for the distributed operating system and/or applications executed in an application space provided by the distributed operating system.

In one example, a method comprises receiving, by a first computing node, implemented in circuitry, of a network device that executes a first instance of a distributed operating system, updated state information for at least one of the distributed operating system or an application executed in an application space provided by the distributed operating system. The method also comprises updating, by the first computing node of the network device, a local data structure of the first computing node of the network device to include the updated state information, the local data structure storing a plurality of objects, each of the objects defining a portion of state information for at least one of the distributed operating system or the application. The method further comprises synchronizing, by the first computing node of the network device, the updated local data structure with a remote data structure of a second instance of the distributed operating system executed by a second node, implemented in circuitry, of the network device.

In another example, a network device comprises a first hardware node implemented in circuitry, and a second hardware node implemented in circuitry. The first hardware node is configured to execute a first instance of a distributed operating system, and maintain a first data structure that stores a plurality of objects, each of the objects defining a portion of state information for at least one of the distributed operating system or an application executed in an application space provided by the distributed operating system. The second hardware node is configured to execute a second instance of the distributed operating system, and maintain a second data structure that stores synchronized versions of the plurality of objects. The first hardware node is further configured to receive updated state information for at least one of the distributed operating system or the application, update the first data structure to include the updated state information, and synchronize the updated first data structure with the second data structure through execution of the first instance of the distributed operating system. The second hardware node is further configured to synchronize the second data structure with the updated first data structure through execution of the second instance of the distributed operating system.

In another example, a non-transitory computer-readable storage medium has stored thereon instructions that, when executed, cause a first processor of a first computing node of a network device to execute a first instance of a distributed operating system to receive updated state information for at least one of the distributed operating system or an application executed in an application space provided by the distributed operating system, update a local data structure of the first computing node of the network device to include the updated state information, the local data structure storing a plurality of objects, each of the objects defining a portion of state information for at least one of the distributed operating system or the application, and synchronize the updated local data structure with a remote data structure of a second instance of the distributed operating system executed by a second computing node of the network device.

In another example, a device comprises a plurality of hardware computing nodes configured to execute a protocol by which to discover a topology of the plurality of hardware computing nodes, and determine, based on the topology, a subset of the plurality of hardware computing nodes to manage execution of a distributed operating system. The determined subset of the plurality of hardware computing nodes are further configured to execute a communication bus by which to synchronize operating system state information between the subset of the plurality of hardware computing nodes. The plurality of hardware computing nodes are further configured to execute, based on the operating system state information, the distributed operating system to provide an execution environment in which one or more applications execute.

In another example, a method comprises executing, by a plurality of hardware computing nodes, a protocol by which to discover a topology of the plurality of hardware computing nodes, and determining, by at least one of the plurality of hardware computing nodes and based on the topology, a subset of the plurality of hardware computing nodes to manage execution of a distributed operating system. The method also comprises executing, by the determined subset of the plurality of hardware computing nodes, a communication bus by which to synchronize operating system state information between the subset of the plurality of hardware computing nodes, and executing, by the plurality of hardware computing nodes and based on the operating system state information, the distributed operating system to provide an execution environment in which one or more applications execute.

In another example, a non-transitory computer-readable storage medium has stored thereon instructions that, when executed, cause one or more of a plurality of hardware computing nodes to execute a protocol by which to discover a topology of the plurality of hardware computing nodes, determine, based on the topology, a subset of the plurality of hardware computing nodes to manage execution of a distributed operating system, execute a communication bus by which to synchronize operating system state information between the subset of the plurality of hardware computing nodes, and execute, based on the operating system state information, the distributed operating system to provide an execution environment in which one or more applications execute.

In another example, a network device comprises a plurality of hardware computing nodes configured to execute a distributed operating system, at least one of the plurality of hardware computing nodes configured to determine whether one or more of the plurality of hardware computing nodes has failed and is no longer supporting execution of the distributed operating system. The at least one of the plurality of hardware computing nodes are further configured to determine whether remaining ones of the plurality of hardware computing nodes exceeds a quorum threshold, and restart, when the remaining ones of the plurality of hardware computing nodes is less than the quorum threshold, the distributed operating system.

In another example, a method comprises determine, by at least one of a plurality of hardware computing nodes included within a network device, whether one or more of the plurality of hardware computing nodes has failed, determine, by the at least one of the plurality of hardware computing nodes, whether remaining ones of the plurality of hardware computing nodes exceeds a quorum threshold, and restart, by the at least one of the plurality of hardware computing nodes and when the remaining ones of the plurality of hardware computing nodes is less than the quorum threshold, the distributed operating system.

In another example, a non-transitory computer-readable storage medium has stored thereon instructions that, when executed, cause one or more processors of a network device to determine whether one or more of a plurality of hardware computing nodes executing a distributed operating system has failed, determine whether remaining ones of the plurality of hardware computing nodes exceeds a quorum threshold, and restart, when the remaining ones of the plurality of hardware computing nodes is less than the quorum threshold, the distributed operating system.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
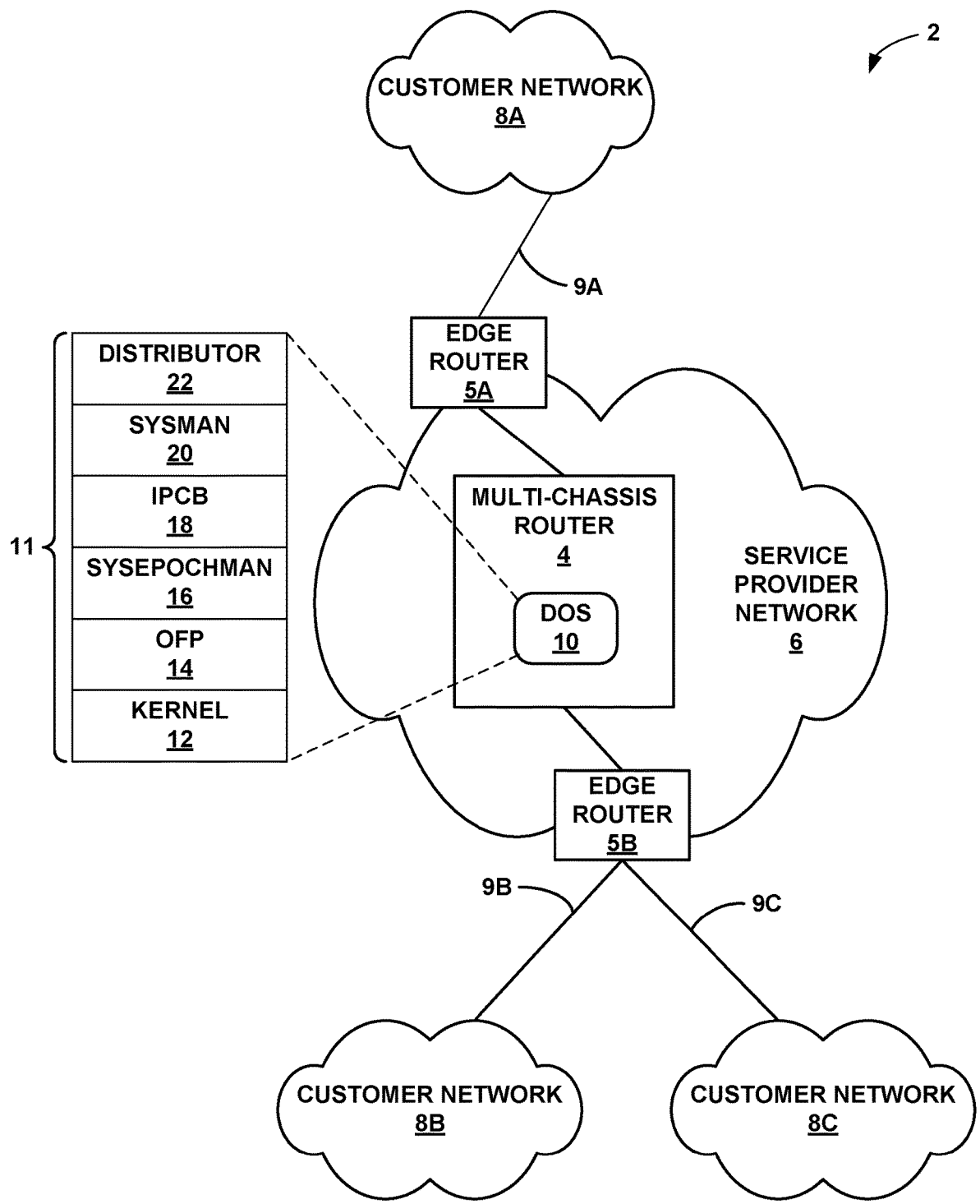
FIG. 1 is block diagram of an example network computing environment in which a service-provider network includes a multi-chassis router configured to operate in accordance with the distributed operating system techniques described in this disclosure.

FIG. 1 is a block diagram illustrating an example computing environment 2 in which service provider network 6 includes a multi-chassis router 4. In this example, multi-chassis router 4 communicates with edge routers 5A and 5B ("edge routers 5") to provide customer networks 8A-8C ("customer networks 8") with access to network 6. In one embodiment, multi-chassis router 4 includes a central switch card chassis (SCC) that operates as a control node and one or more line card chassis (LCCs) that operate as packet routing devices. The LCCs may contain all the physical interfaces for coupling to other devices within network 6, while the SCC controls and routes traffic between the LCCs.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. Service provider network 6 may include a variety of network devices other than multi-chassis router 4 and edge routers 5, such as additional routers, switches, servers, or other devices.

In the illustrated embodiment, edge router 5A is coupled to customer network 8A via access link 9A and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, cellular phones (including so-called "smart phones"), tablet computers, workstations, servers, switches, printers, or other devices. The configuration of network 2 illustrated in FIG. 1 is merely exemplary. For example, service provider network 6 may be coupled to any number of customer networks 8. Nonetheless, for ease of description, only customer networks 8A-8C are illustrated in FIG. 1.

Multi-chassis router 4 may provide for failover by including a primary routing engine as well as one or more standby routing engines. For example, an SCC may contain primary and standby master routing engines, and one or more LCCs may contain primary and standby local routing engines. Primary master routing engine may propagate state information to the standby master engine prior to forwarding the state information to the primary local routing engines in the LCCs. Similarly, the primary local routing engines propagate the state information to one or more standby local routing engines prior to forwarding the state information to consumer components (which may be referred to as "consumers") within their chassis. In this manner, multi-chassis router 4 enforces a synchronization gradient when communicating state information throughout the multi-chassis environment.

In the event a primary routing engine fails, a standby routing engine in the same chassis assumes control over routing resources and routing functionality for that chassis. Moreover, because state information is propagated to a standby routing engine prior to forwarding the state information to a consumer, a standby routing engine can take up forwarding state information to consumers at the same place where the primary routing engine left off. U.S. Pat. No. 7,739,403 titled "Synchronizing State Information Between Control Units", filed Oct. 3, 2003, describes techniques for a synchronization gradient within a standalone router and is hereby incorporated by reference. U.S. Pat. No. 7,518,986 titled "Push-Based Hierarchical State Propagation within a Multi-Chassis Network Device," filed Nov. 16, 2005, describes techniques for a push-based state synchronization within multi-chassis routers and is hereby incorporated by reference. In this manner, the primary and standby routing engines synchronize their respective state information to allow the standby routing engine to assume control of the router resources without having to relearn state information.

In instances where the primary master routing engine pushes state information to each consumer, each of the consumers receives any state information produced by the primary master routing engine. As networks become larger and more complex in terms of the number of services offered, the primary master routing engine may likewise produce more state information concerning the additional services, which has to be consumed by a potentially larger number of consumers (especially in the context of distributed systems, such as software defined networks having hundreds of computing nodes acting as consumers, or in large scale data centers having potentially hundreds of computing nodes acting as consumers). Producer components (which may also be referred to as "producers") may refer to any of the above noted components that produce state information, such as the primary master routing engine, primary local routing engines, and the like. Consumers may denote any of the above noted components that consume state information, such as primary local routing engines, interface cards, and the like.

In these circumstances, consumers may become inundated with state information that may or may not be relevant to the role of the consumers in multi-chassis router 4. Consumers may therefore receive a large amount of state information that must be processed to determine whether such state information is relevant, discarding any state information that the consumer does not require in order to perform the operations for which the consumers are configured to perform. Distribution of state information according to the push model where consumers passively receive all state information produced by producers (e.g., the primary master routing engine) may not adapt well as networks grow and become increasingly more complex (in terms of services offered, protocols executed, and the like).

Furthermore, the push-model for propagating state information is premised upon the producers and at least some of the consumers (e.g., subordinate routing engines, such as the primary routing engines of the LCCs and any of the standby routing engines) each executing a distinct instance of the operating system. Each distinct instance of the operating system may require some subset (up to and including, in some instances, all) of the state information. Any one instance of the operating system that may fail (e.g., due to hardware failure, loss of power, corrupt memory, etc.) may impact operation of the multi-chassis router, potentially resulting in loss of packets or an interruption of packet forwarding.

In accordance with the techniques described in this disclosure, multi-chassis router 4 may be configured to execute a single instance of an operating system 10 across all computing nodes (which may collectively refer to all producers and consumers) of multi-chassis router 4. The operating system described in this disclosure may be referred to as a distributed operating system 10 ("DOS 10") in that execution is distributed across all computing nodes. Each of the computing nodes may self-organize, coalescing so as to execute the single instance of distributed operating system 10. The computing nodes may include hardware computing nodes (such as routing engines, hardware forwarding units—which may include application specific integrated circuits, and interface cards) and virtual computing nodes executed by hardware control units (e.g., one or more processors, one or more application specific integrated circuits, field-programmable gate arrays, etc.).

As such, when a computing node within multi-chassis router 4 fails, the remaining computing nodes may continue to execute the single instance of distributed operating system 10, potentially without impacting packet forwarding or other operation of multi-chassis router 4. In other words, the number of computing nodes supporting execution of the single instance of distributed operating system 10 may expand and contract without, in some instances, impacting operation of multi-chassis router 4. In this sense, the distributed operating system may be considered to be fully elastic as the number of computing nodes may grow or shrink (to some extent).

After coalescing to execute the single instance of distributed operating system 10 (which may be referred to as the "distributed operating system"), the computing nodes may execute a distributed application suite within the execution environment provided by the distributed operating system. Applications, in the context of multi-chassis router 4, may include network protocols, such as routing protocols, management protocols, management interfaces (graphical user interfaces (GUIs), command line interfaces (CLIs), etc.), communication protocols, and the like.

Distributed operating system 10 may distribute application among the computing nodes supporting execution of distributed operating system 10 based on computing node capability and/or role within multi-chassis router 4. Distributed operating system 10 may manage propagation of state information in support of the execution of distributed operating system 10 and/or the applications executing within the execution environment provided by distributed operating system 10.

Distributed operating system 10 may utilize a hierarchical naming scheme for propagating state information from producers to consumers. Rather than push all state information produced by every producer to each and every consumer, multi-chassis router 4 may establish the hierarchical naming scheme so as to associate objects (which may refer to a discrete portion of state information) with a scope of distribution, which results in distribution of the objects only to those consumers that have requested the particular object. Using the hierarchical naming scheme, a consumer within multi-chassis router 4 may request any scope of state information up to and including all of the state information produced by any producer within multi-chassis router 4, and down to an individual object. More information regarding the hierarchical naming scheme and how the hierarchical naming scheme may more efficiently propagate state information using an object flooding protocol (OFP) can be found in U.S. application Ser. No. 15/198,912, entitled "HIERARCHICAL NAMING SCHEME FOR STATE PROPAGATION WITHIN NETWORK DEVICES," filed Jun. 30, 2016, the entire contents of which are hereby incorporated by reference as if set forth in its entirety.

In operation, each of the computing nodes of multi-chassis router 4 may first execute the same infrastructure to support execution of distributed operating system 10. For example, each of the computing nodes of multi-chassis router 4 may execute a kernel 12, such as a Unix® kernel. Execution of each instance of kernel 12 is considered "separate" at this point only because the computing nodes have not yet coalesced to support execution of distributed operating system 10. After self-organizing (or, in other words, coalescing), the computing nodes may execute a single distributed kernel 12 to the extent that kernel 12 is aware of applications and/or other processes executed by other computing nodes. Executing a uniform kernel 12 across all of the computing nodes may improve reliability in that kernel 12 may only rarely be updated, allowing for upgrades further up software stack 11 to occur without reboots (as the kernel may not change between upgrade releases). Separating kernel 12 from other aspects of distributed operating system 10 may also decouple the update cycle for kernel 12 from that of other processes or features of distributed operating system 10.

After executing the separate instances of kernel 12, each computing node may next execute OFP 14. OFP 14, as noted above, may propagate the state information between the computing nodes of distributed operating system 10. As noted above, OFP 14 may provide a subscription model for state information propagation, thereby allowing for potentially more efficient propagation of state information compared to a push-model of state information propagation. OFP 14 may allow for a multicast type of state information propagation that may reliably deliver state information to multiple computing nodes of distributed operating system 10 concurrently.

OFP 14 may also allow for self-assembly, where OFP 14 provides a mechanism by which to discover computing nodes available to participate in execution of distributed operating system 10, and the link interconnecting the computing nodes. OFP 14 may generate a graph data structure representative of a topology of the computing nodes and links, with edges of the graph data structure representing the links interconnecting computing nodes, and the graph nodes of the graph data structure representing the computing nodes available to support execution of distributed operating system 10. The graph nodes are referred to as graph nodes to distinguish from the nodes of the graph data structure from the computing nodes supporting execution of distributed operating system 10. Reference to "nodes" in this disclosure is intended to refer to the nodes supporting execution of distributed operating system 10 and not the graph nodes of the graph data structure unless explicitly noted elsewhere or clearly implied by context. OFP 14 may also provide node reachability services to determine liveliness of nodes.

After initializing OFP 14, each of the computing nodes of multi-chassis router 4 may next execute a system epoch management (SysEpochMan) process 16. SysEpochMan process 16 may organize the (up to this point, distinct and separate) computing nodes to support execution of single distributed operating system 10. SysEpochMan process 16 may also monitor distributed operating system 10 to ensure integrity should one or more computing nodes fail. SysEpochMan process 16 may provide for transitions from the previous system state to the new system state in the event of, to provide a few examples, changes to the number of computing nodes, interruption in inter-node connection, the organization of the computing nodes, and/or changes in computing node roles.

SysEpochMan process 16 may establish (and maintain) a Zookeeper® plane (where Zookeeper® refers to the Apache Zookeeper® project) and the OFP domain (which may refer to an OFP domain for use by distributed operating system 10 to propagate state information particular to distributed operating system 10 and not related to applications). While described with respect to Zookeeper®, the techniques of this disclosure may be performed with respect to any inter-process communication bus or mechanism. As such, Zookeeper® is referred to throughout this disclosure more generally as an inter-process communication bus 18 ("IPCB 18").

IPCB 18 may differ from OFP 14 in that OFP 14 is an asynchronous communication protocol (meaning that OFP may guarantee eventual object delivery without ensuring ordered delivery of the objects) while IPCB 18 is a synchronous communication protocol (meaning that IPCB 18 may ensure delivery with proper ordering of changes, or in other words, all computing nodes receive the changes in the order the changes occur). IPCB 18 may execute within the SysEpochMan process 16 to coordinate services such as leader election (within the computing nodes) and namespace allocation.

After forming IPCB 18 (and assuming OFP 14 is operational), the computing nodes of multi-chassis router 4 may effectively communicate with one another to coalesce and execute distributed operating system 10. The computing nodes may next execute a system manager ("SysMan") process 20 that coordinates the execution of applications within the execution environment provided by the distributed operating system. Each of SysMan processes 20 may elect a SysMan master instance (e.g., using IPCB 18), which may be responsible for execution of applications on particular computing nodes according to, as one example, a policy engine.

The SysMan master process may communicate (e.g., via IPCB 18) the application decisions to the local SysMan processes that then act on the application decisions to execute the applications. The local SysMan processes monitor the executing of the applications and provide a status of the application to the SysMan master process to allow the SysMan master process to monitor the status of the applications. When the status indicates that an application has failed, the SysMan master process may, to provide a few examples, reinitiate execution of the application (by the same or a different computing node) or activate a standby instance of the application.

The computing nodes of multi-chassis router 4 may also execute a distributor process 22 as part of distributed operation system 10. Distributor process 22 (which may also be referred to as the "distributor 22") may form an object daemon data store (DDS) and coordinate with individual applications for delivery of state information. Distributor 22 may operate as a client to OFP 14, and deliver objects between distributors executed by the different computing nodes.

As noted above, distributed operating system 10 executes to provide an execution environment in which the applications may operate. From the perspective of the distributed operating system, the computing nodes are all uniform and only distinguishable by which applications each computing node executes. Applications may refer to any process that is not described above with respect to distributed operating systems 10, including Unix® daemons, and PFE applications (or, in other words, software) other than low level drivers and/or firmware.

SysMan 20 may distribute applications across multiple computing nodes, using objects to communicate the state information associated with these types of distributed applications. For example, multi-chassis router 4 may execute an application including the routing protocol daemon (RPD) and a collection of one or more PFE route handlers.

SysMan process 18 does not bind applications to particular hardware, thereby allowing application mobility (which may also be referred to as "process mobility"). SysMan process 18 may transfer applications between processing units or other hardware within a given computing node or between computing nodes to provide for failure recover, load balancing, and/or in-service system updates (ISSU).

As noted above, distributed operating system 10 initially executes OFP 14 to determine a topology of computing nodes that allows for coalescence and execution by the computing nodes of the single instance of distributed operating system 10. OFP physical topology discovery may occur in a manner similar to that of link state protocols. OFP 14 may "discover" the links to which the particular instance of OFP 14 is coupled by configuration. That is, a network administrator or other operator may configure OFP 14 with the links to which each particular instance of OFP 14 is coupled. OFP 14 discovers computing nodes using an announcement protocol by which each computing node periodically multicasts the computing node identity on each link to which that computing node is connected.

OFP 14 classifies each computing node as a primary computing node and a secondary computing node. An administrator may configure computing nodes as either primary or secondary, where an example of primary computing nodes may include a routing engine (or, in other words, a computing node supporting a control plane), and an example of a secondary computing node may include a line card (or, in other words, a computing node supporting the forwarding plane). In some instances, the primary computing nodes may refer to any computing node with enhanced processing and/or memory capabilities in comparison to secondary computing nodes. OFP 14 may attempt to offload as much processing to primary computing nodes given the enhanced processing and memory capabilities.

The primary OFP computing nodes may send the announcement to all computing nodes participating in distributed operating system 10 (meaning all primary and secondary OFP computing nodes). The secondary OFP computing nodes may send the announcement to all primary OFP computing nodes (and not, in some examples, all of the secondary OFP computing nodes). Although described as not transmitting announcements to primary OFP computing nodes, secondary OFP computing nodes may, in some examples, transmit announcements to the one or more secondary OFP computing nodes.

Each OFP computing node that receives the announcement configures the physical topology graph data structure to identify the announcing computing node as a neighbor. Assuming that secondary computing nodes only transmit announcements to primary OFP computing nodes, secondary OFP computing nodes cannot become neighbors with one another as the secondary OFP computing nodes never receive an announcement from another secondary OFP computing nodes by which to establish the neighbor relationship. OFP 14 constructs the graph data structure representative of the topology of primary and secondary computing nodes interconnected with one another by the links based on the announcements.

SysEpochMan 16 may, after OFP 14 constructs the graph data structure representative of the topology of primary and secondary computing nodes, elect an epoch manager master from among those computing nodes configured to execute as epoch managers. As one example, a network administrator may configure computing nodes capable of executing inter-process communication bus 18 (IPCB—e.g., Zookeeper®) as epoch managers. The elected epoch manager master may elect one or more of the epoch managers (including the elected epoch manager master) to act as epoch managers. Each of the epoch managers may then execute IPCB 18.

IPCB 18 forms a network of servers and clients. The servers may be referred to as an IPCB ensemble. IPCB 18 may utilize a quorum system in which a majority of servers (e.g., more than (N/2)+1, where N represents the number of servers/epoch managers) are connected and functioning for IPCB 18 to continue successful operation. IPCB clients represent computing nodes that utilize IPCB 18. The IPCB clients may interface with any IPCB server to utilize IPCB 18. Utilizing IPCB 18, the IPCB clients may interact with a shared file system to write data to and/or read data from the shared file system, while also being able to configure notifications with regard to changes to the shared file system. In this way, the techniques may allow for separate (or in other words individual) computing nodes to coalesce for purposes of executing distributed operating system 10.

Upon successfully launching distributed operating system 10, distributed operating system 10 may present another OFP domain for use by the applications in propagating state information from producers to consumers. For example, the computing nodes of multi-chassis router 4 may synchronize state information for distributed operating system 10, the applications, or other elements of multi-chassis router 4. In particular, each of the computing nodes may instantiate a respective data structure that stores a plurality of objects, where each of the objects defines at least a portion of the state information, e.g., for distributed operating system 10 and/or for one or more of the applications. The computing nodes may synchronize the respective data structures according to the OFP domain, by executing OFP 14. Furthermore, the computing nodes may use the synchronized data structures for configuration, e.g., of themselves and/or other components of the computing nodes.

A radix trie is a tree that is structured by its keys, for which every interior trie node has at least two children. To locate a trie node with a particular key, the tree is walked by examining the contents of the key, starting at the left-hand side. A radix trie is a minimal tree in that there are no internal trie nodes with only a single child. A Patricia Trie is a particular form of a radix trie.

In some examples, the computing nodes may instantiate the data structures for storing the plurality of objects as tree data structures, such as radix tries. For example, the computing nodes executing various instances of distributed operating system 10 may instantiate one or more topics arranged in a hierarchical manner (i.e., according to the tree data structure). The hierarchically arranged topics may have various levels of scope with topics situated above another topic in the hierarchy being inclusive of any state published to the topics under a topic situated above the underlying topic. The computing nodes may therefore instantiate tree data structures to store the hierarchically arranged topics, where the computing nodes executing respective instances of distributed operating system 10 may form tree nodes of the tree data structure to topics.

For example, topic "/a" may be an aggregate of topics "/a," "/a/b," and "a/b/c." Topic "/a/b," as another example, may be an aggregate of topics "a/b," and "a/b/c." Thus, a first tree node of the tree data structure may correspond to topic "/a," a first leaf tree node of the first tree node may correspond to topic "/a/b," and a second leaf tree node of the first leaf tree node may correspond to topic "/a/b/c." In this manner, a topic string may be obtained from a tree node of the tree data structure and leaf tree nodes from the node. The topic string may correspond to a string representation of the topic, which in this case happens to be the topic hierarchy itself. In some examples, the hierarchically arranged topics will have only one root topic (which may be referred to as a "root topic tree node") with multiple hierarchies under the root topic tree node, similar to the tree data structure.

Other nodes, applications, or components of nodes may act as consumers of these topics. The consumers may, once these topics are instantiated, receive updates to a local topic database informing the consumer of the new topics. The consumers may then subscribe to the new topic such that the objects published to the topic are distributed only to the subscribing consumers. The consumers may then consume the objects to update local state information without having to filter or otherwise discard objects that are not relevant to the operation of the consumer.

Figure 3:
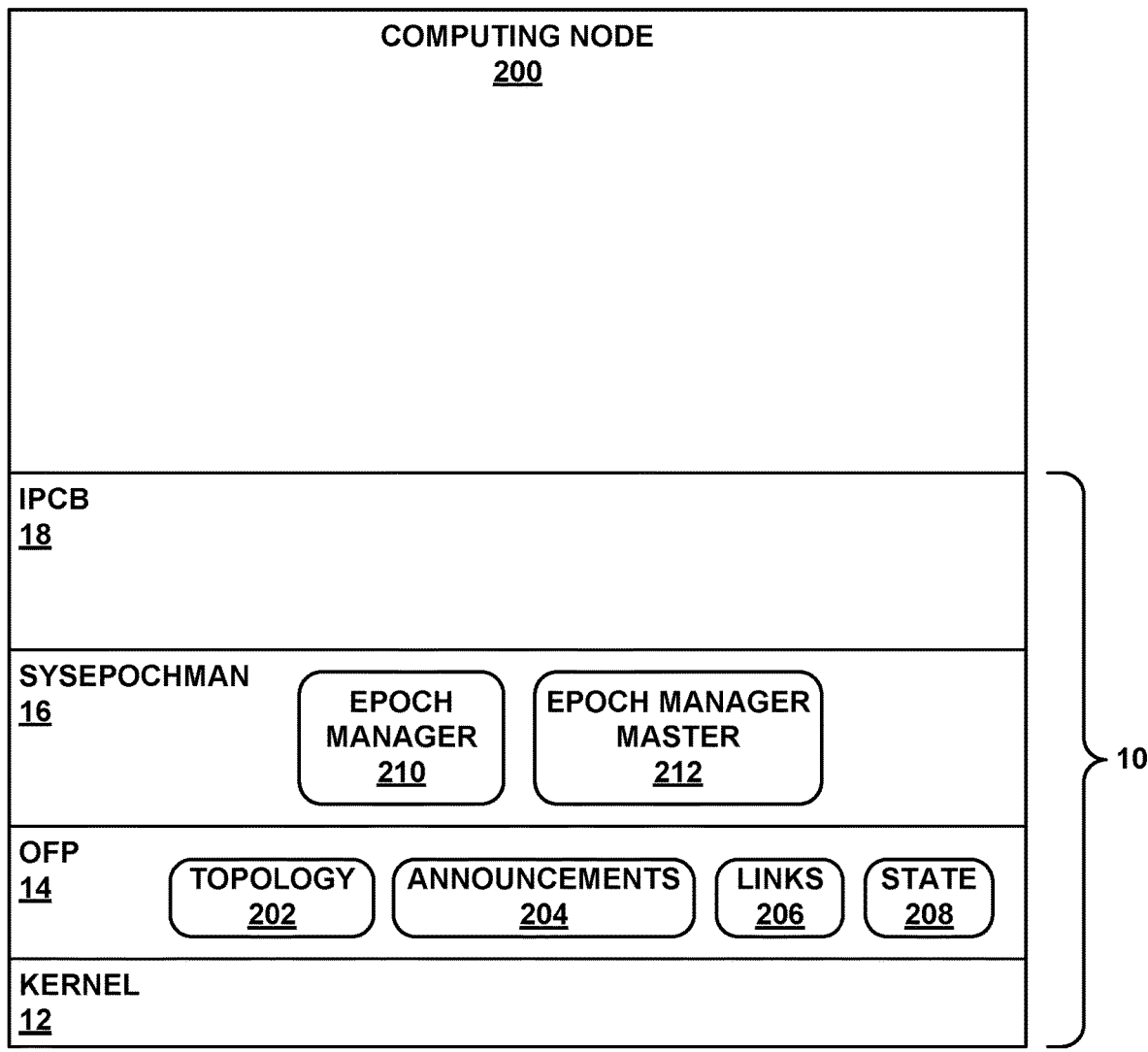
FIG. 3 is a block diagram illustrating an example node of multi-chassis router shown in FIG. 2 configured to operate in accordance with various aspects of the distributed operating system techniques described in this disclosure.

The producers may instantiate a topic within the hierarchy through interactions with an application infrastructure. The application infrastructure may tag each topic with one or more 32-bit scope IDs (which are collectively referred to as a scope vector) identifying the scope to which the corresponding tagged object is to be delivered. Each consumer subscribes to one or more scope IDs (via requests for the corresponding topic), and the application infrastructure automatically delivers the objects having the corresponding scope IDs to the consumers that requested such topics. The various units responsible for mapping scope IDs to objects and distribution of the objects is described in more detail with respect to a single computing node of multi-chassis router 4 as shown in FIG. 3.

In OFP, the leaves of a tree data structure represent individual message fragments, and the key is the fragment ID. Thus, any internal tree node represents a fragment ID prefix, and thus a range of fragment IDs. The root tree node may represent a zero-length prefix, and the "range" of all possible fragments. Each tree node carries a hash value that represents a digest of all fragments covered by the prefix.

The leaf tree nodes are degenerate examples—the digest is the Contribution of the fragment, and the fragment ID prefix is the fragment ID itself. In accordance with OFP, computing node 200 (or a processing unit thereof) calculates the contribution from the (logical clock, checksum) tuple described earlier, and positions the corresponding tree node in the tree data structure according to its fragment ID. By adding a reference to the fragment itself to the leaf tree node, the tree data structure can be used for looking up fragments as well.

The maximum fanout of a radix trie node is VS, where V is the number of possible values of a symbol and S is the symbol count. In OFP, a symbol is a single bit (the fragment ID is viewed as a bit string) so a value of S may be selected to provide an appropriate amount of fanout. A strictly binary tree would have V=2 and S=1, resulting in a very deep tree. For OFP, S is typically a small value greater than 1 (e.g., 4), which makes the tree a bit branchier and less deep.

The tree data structures may be immutable. Immutability of the tree data structures may facilitate scaling, as it means that all operations (including extractions of arbitrary sub-trees) can be done in Log time, save for a traversal (which requires N*log(N) time). OFP 14 may set the tree data structures as immutable, which may improve scalability.

Tree nodes of the tree data structure may represent a hierarchy of "digests" (which are similar to checksums). The digests may comprise, for example, a scalar value (such as a modified Fletcher-64 checksum) representative of the content stored by leaf tree nodes of the tree data structure that is accessible by the respective one of the tree nodes of the tree data structure. Nodes supporting execution of distributed operating system 10 may store message fragments in the tree data structure, arranged by respective fragment identifiers (fragment IDs). OFP 14 may separate messages into a series of fragments, each of which fits into a single packet. OFP 14 may label the fragments with a fragment ID, which includes a tuple (Scope, Message ID, fragment number), as well as a logical clock value from the original, separated message. A reliability model for OFP operates on individual fragments (thereby reducing the impact of loss of a packet). As such, computing nodes supporting execution of distributed operating system 10 may separate a message into constituent fragments, and store each fragment as a tree node in the tree data structure, arranged by fragment IDs for the respective fragments.

Furthermore, computing nodes supporting execution of distributed operating system 10 may form interior tree nodes of the tree data structure to represent a block of fragment IDs (in the form of a prefix) and to include digests that represent all of the fragments in the blocks they represent. Thus, the root of the tree data structure, which represents a zero-length prefix, includes a digest that covers all messages in the topology. As such, the cost of determining that two tree nodes have the same topology contents is reduced to O(1) (as long as the contents are identical).

Whenever one of the computing nodes of distributed operating system 10 modifies one of the message fragments, the one of the computing nodes of distributed operating system 10 also incrementally updates the digests of all of the message fragment's ancestors, back to the root of the tree data structure.

In this manner, two or more computing nodes of distributed operating system 10 may synchronize their respective tree data structures by comparing respective digests of tree nodes of the respective tree data structures. When the digests for corresponding tree nodes of the tree data structures match, the computing nodes of distributed operating system 10 may determine that the tree data structures are synchronized. However, when the digests for corresponding tree nodes do not match, the computing nodes of distributed operating system 10 may determine that the tree data structures are not synchronized. Accordingly, the computing nodes of distributed operating system 10 may exchange messages (e.g., in the form of message fragments) to synchronize the respective tree data structures. Thus, two tree data structures may be described as synchronized when the tree data structures have a common arrangement and interconnection of tree nodes within each of the tree data structures and when the digests of corresponding tree nodes of the tree data structures match.

For example, the computing nodes of distributed operating system 10 may initially determine that two corresponding tree nodes of their respective tree data structures are not synchronized. The computing nodes of distributed operating system 10 may then determine which of the two tree nodes of the respective tree data structures includes a higher (i.e., more recent) logical clock value. The tree node of the tree data structures having the more recent logical clock value may be considered most current, and therefore correct. Accordingly, the computing node of distributed operating system 10 having the tree node of the tree data structure with the more recent logical clock value may send the corresponding message or message fragments for the tree data structure to other computing nodes of distributed operating system 10. The other computing nodes of distributed operating system 10 may update their corresponding tree data structures using the message or message fragments, thereby synchronizing at least these branches of the tree data structures.

Computing nodes of distributed operating system 10 may further add, modify, or delete message fragments. To add or delete a message fragment, the computing nodes of distributed operating system 10 modify the respective tree data structures to add or delete corresponding tree nodes to or from the tree data structure. To modify a message fragment, the computing nodes of distributed operating system 10 update the contents of the appropriate tree nodes of the tree data structures. Furthermore, in response to adding, modifying, or deleting message fragments, the computing nodes of distributed operating system 10 walk the corresponding tree data structures from the leaf tree nodes to the root, incrementally updating the digests of the tree nodes of the tree data structures along the way. Since the digest value at any tree node is a contribution, the old digest is subtracted (as defined above) from its parent's digest, and the new value is added, and the process recurses upward toward the root.

In examples in which the tree data structures are radix tries and the digests are Fletcher-64 checksums, adding or deleting a leaf tree node may cause the creation or deletion of interior tree nodes. The contribution of a nonexistent tree node may be zero (due to the use of Fletcher), so that value is used as tree nodes are created or destroyed.

The worst-case cost of updating the tree data structures in these examples is O(log F N), where F is the maximum tree node fanout and N is the number of message fragments. In practice, this may be quite small—with one million objects and a fanout of 16, the cost is O(5), for 16 million objects it is O(6), etc. In this way, the techniques may efficiently maintain state synchronization between the various computing nodes for execution of either distributed operating system 10 or application, or both distributed operating system 10 and applications.

After forming the quorum and establishing IPCB 18 by which the clients may interface with the shared file system and thereby execute distributed operating system 10 to facilitate the exchange and synchronization of state information, IPCB 18 may monitor the IPCB servers to determine whether connectivity between one or more of the plurality of computing nodes has failed. For example, when an IPCB epoch manager fails or a link fails (which may be generally referred to as a "connectivity failure"), the remaining IPCB epoch managers may determine whether the quorum of epoch managers exists.

The remaining IPCB epoch manager may determine whether the quorum of epoch managers exists by comparing the number of epoch managers still operational (denoted by the variable "N") is greater than, or greater than or equal to, a connectivity failure threshold (e.g., (N/2)+1). The connectivity failure threshold may also be referred to as a "quorum threshold." When the number of remaining epoch managers exceeds the connectivity failure threshold, the remaining epoch managers may maintain the quorum and continue operating, potentially adding to the quorum new epoch managers that were not elected as epoch managers during the formation of the quorum. When the number of remaining epoch managers does not exceed the connectivity failure threshold, the remaining epoch managers may restart distributed operating system 10 (which may not require restarting multi-chassis router 4 or kernel 12, but only restarting one or more of those layers above kernel 12 in software stack 11, such as OFP 14, SysEpochMan 16, IPCB 18, SysMan 20, and/or distributor 22).

In this way, distributed operating system 10 of multi-chassis router 4 may coalesce from a number of different computing nodes of various different types and capabilities. OFP 14 may execute to discover the computing node topology, allowing IPCB 18 to form so as to establish the quorum by which to ensure sufficient resources to continue successful execution of distributed operating system 10. The quorum may ensure that sufficient resources are available to allow for successful propagation of the state information, while also, as described in more detail below, allowing for mechanisms by which to overcome split-brain situations in which the computing node topology is separated into two different execution environments.

Figure 2:
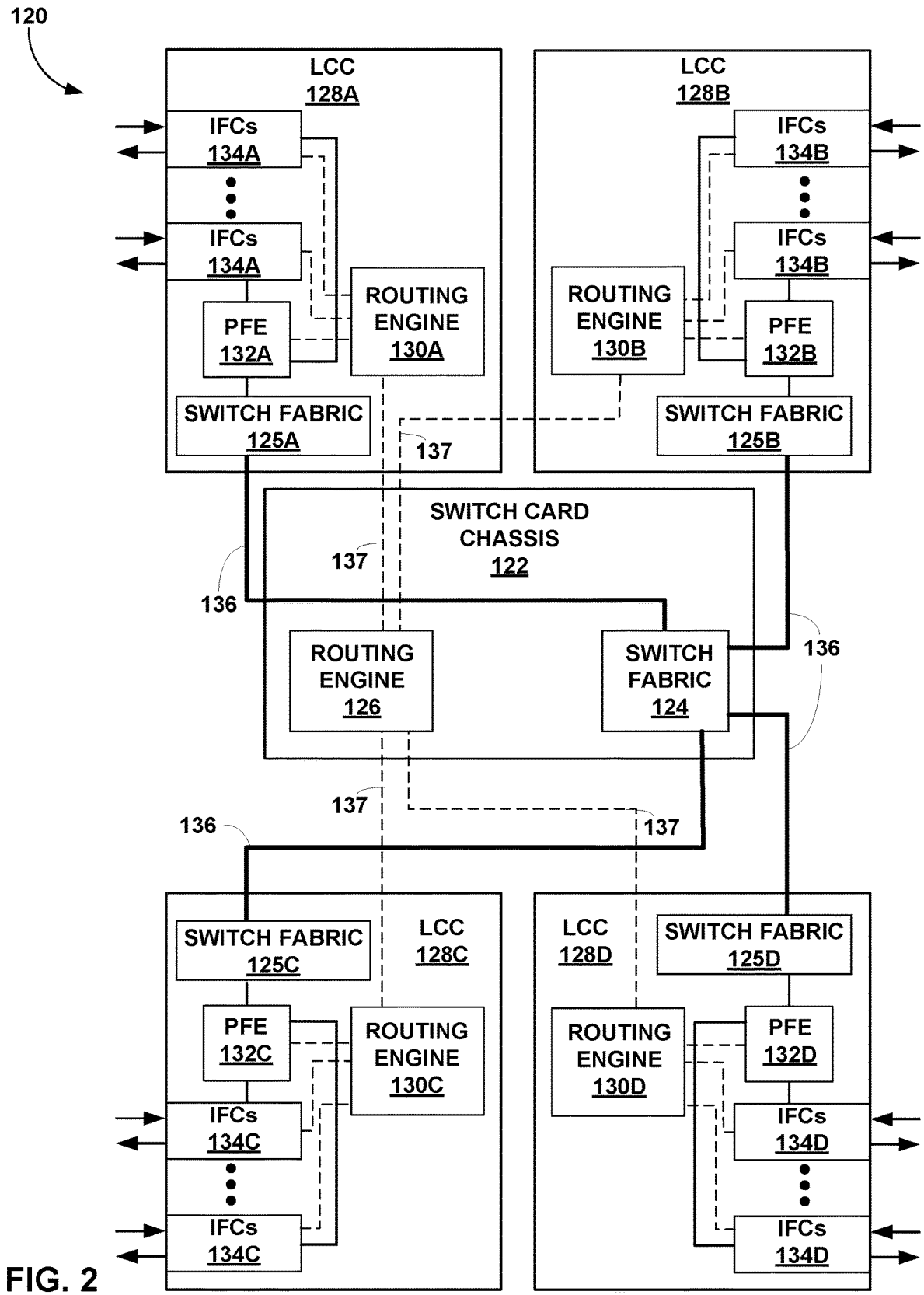
FIG. 2 is a block diagram illustrating an exemplary multi-chassis router configured to operate in accordance with the distributed operating system techniques described in this disclosure.

FIG. 2 is a block diagram illustrating an exemplary multi-chassis router 120 configured to operate in accordance with the techniques described in this disclosure. Multi-chassis router 120 routes data packets between network devices across a network. In this example, multi-chassis router 120 comprises four substantially identical LCCs 128A-128D ("LCCs 128") and SCC 122 that operates as a central control node. In other embodiments, a multi-chassis router may include more or less LCCs. SCC 122 provides centralized switching and control for multi-chassis router 120. LCCs 128 provide interfaces to a network using IFC sets 134A-134D ("IFCs 134").

SCC 122 includes switch fabric 124 and a master routing engine 126. Although not shown in the example of FIG. 2, SCC 122 may include a standby master routing engine when multi-chassis router 120 is configured as a high-availability router. Switch fabric 124 provides a back-side connection, i.e. a connection separate from the network, between switch fabric 125 of LCCs 128. Functions of master routing engine 126 include maintaining routing information to describe a topology of a network, and using that information to derive forwarding information bases (FIBs). Routing engine 126 controls packet forwarding throughout multi-chassis router 120 by installing the FIB in LCCs 128 via communication with local routing engines 130 over cables 137. A FIB for one of LCCs 128 may be the same or different than an FIB for other LCCs 128 and SCC 122. Because cables 137 provide a dedicated connection, i.e., separate from a data packet forwarding connection provided by cables 136, between SCC 122 and LCCs 128, FIBS in LCC routing engines 130 can be updated without interrupting packet forwarding performance of multi-chassis router 120.

LCCs 128 each contain one of local routing engines 130A-130D ("routing engines 130"), one of switch fabrics 125A-125D ("switch fabric 125"), at least one packet forwarding engine (PFE), shown as PFEs 132A-132D ("PFEs 132"), and one or more IFCs 134. In some examples when multi-chassis router 120 is configured to provide high-availability, LCCs 128 may also include one of standby local routing engines in addition to one of local routing engines 130, which may be referred to as primary local routing engines 130 in the high-availability configuration.

Multi-chassis router 120 performs routing functions in the following manner. An incoming data packet is first received from a network by one of IFCs 134, e.g., 134B, which directs it to one of PFEs 132, e.g., PFE 132B. The PFE then determines a proper route for the data packet using the FIB provided by the primary local routing engine, e.g., routing engine 130B. If the data packet is destined for an outbound link associated with the one of IFCs 134 that initially receive the packet, the PFE forwards the packet to the outbound link. In this manner, packets sent out by the same PFE on which they were received from the network bypass switch fabric 124 and switch fabric 125.

Otherwise, the PFE sends the data packet to switch fabric 125, where it is directed to switch fabric 124 and follows a route to one of the other PFEs 132, e.g., PFE 132D. This PFE, e.g., PFE 132D, sends the data packet across the network via one of IFCs 134, e.g., IFC 134D. Thus an incoming data packet received by one of LCCs 128 may be sent by another one of LCCs 128 to its destination. Other multi-chassis routers that operate in a manner consistent with the techniques described in this disclosure may use different switching and routing mechanisms.

Local routing engines 130 control and manage LCCs 128, but are subservient to master routing engine 126 of SCC 122. For example, after receiving state information updates from master routing engine 126, local routing engines 130 forward the state information update to consumers on LCCs 128 using the hierarchically-ordered and temporally-linked data structure. For example, consumers that receive state information updates from local routing engines 130 include PFEs 132 and IFCs 134. Local routing engines 130 also distribute the FIB derived by primary master routing engine 126 to PFEs 132.

Routing engines 126 and 130 may operate according to executable instructions fetched from one or more computer-readable media. Examples of such media include random access memory (RAM), read-only memory (ROM), non-volatile random access memory (NVRAM), electrically erasable programmable read-only memory (EEPROM), flash memory, and the like. The functions of multi-chassis router 120 may be implemented by executing the instructions of the computer-readable medium with one or more processors, discrete hardware circuitry, firmware, software executing on a programmable processor, or combinations thereof.

As described above, nodes may include routing engine 126, routing engines 130, PFEs 132, and IFCs 134. Links may include switch fabric 124 and cables 136 and 137, as well as other cables shown but not enumerated for ease of illustration purposes. The various nodes may perform aspects of the techniques described below in more detail with respect to a single node of multi-chassis router 120 shown in FIG. 3.

FIG. 3 is a block diagram illustrating an example computing node 200 of multi-chassis router 120 configured to operate in accordance with various aspects of the techniques described in this disclosure. As examples, computing node 200 may represent routing engine 126, one of routing engines 130, switch card chassis 122, or one of line card chassis 128.

As shown in FIG. 3, computing node 200 executes kernel 12 that enables interaction with the hardware of computing node 200. Once kernel 12 is operational, computing node 200 may execute OFP 14, by which to determine a topology 202 of computing nodes executing within multi-chassis router 120. Topology 202 may represent the above noted graph data structure including graph nodes representative of the computing nodes of multi-chassis router 120, and edges interconnecting the graph nodes representative of link interconnecting the computing nodes of the multi-chassis router 120.

OFP 14 may discover or otherwise determine topology 202 through receipt of announcements 204. OFP 14 may receive announcements 204 from each of the other computing nodes supporting execution of distributed operating system 10, either as producers or consumers of state information. Each of announcements 204 may specify a computing node and one or more links directly coupled to that computing node. OFP 14 may be configured (e.g., by a network administrator) with links directly coupling to computing node 200. From announcements 204 and link 206, OFP 14 may construct topology 202. OFP 14 further includes state 208, representing a state data structure, such as a tree data structure, in accordance with the techniques of this disclosure.

From links 206, OFP 14 may also generate an announcement 204, transmitting the generated one of announcements 204 via the links identified by links 206 so that OFP 14 executed by adjacent computing nodes may likewise generate topology 202. Like link state routing protocols, OFP 14 operates to form a local copy of topology 202 at each of the computing nodes (or, in some instances, only at the primary computing nodes). OFP 14 may flood changes to topology 202 detected by computing node 200 (such as a computing node or a link going down) via announcements 204, thereby allowing topology 202 to remain synchronized at each computing node 200 supporting execution of distributed operating system 10. OFP may expose topology 202 (via an application programming interface—API) to SysEpochMan 16.

During initialization, SysEpochMan 16 may first subscribe to an EpochManagement scope within OFP domain 0, and assuming SysEpochMan 16 is configured as being epoch manager (EM or Em) capable, subscribes to an EmCapableNodes scope within OFP domain 0. SysEpochMan 16 may initially publish an epoch manager object 210 into OFP domain 0 (which as noted above is formed by OFP 14 for use by the underlying infrastructure of distributed operating system 10, such as OFP 14, SysEpochMan 16, IPCB 18, etc.). The epoch manager object 210 indicates whether computing node 200 has been configured as capable of acting as an epoch manager, and an epoch manager priority configured for computing node 200 to act as an epoch manager. A higher epoch manager priority indicates that computing node 200 is more likely to be chosen as an epoch manager compared to a lower epoch manager priority. As such, the epoch manager priority allows network administrators to bias epoch manager functionality toward or away from particular computing nodes.

Epoch manager object 210 may also include a hardware master indication, which indicates whether computing node 200 owns hardware mastership, where such information may be used in two epoch manager-capable node systems to determine whether a quorum is present. Epoch manager object 210 may also include a master identifier (ID) indicating a nomination for computing node 200 for acting as epoch manager master. Epoch manager object 210 may also indicate a master priority, which may indicate a priority of computing node 200 for epoch manager master election. Like the epoch manager priority, a higher epoch manager master priority indicates that computing node 200 is more likely to be chosen as an epoch manager master compared to a lower epoch manager master priority. As such, the epoch manager master priority allows network administrators to bias epoch manager master functionality toward or away from particular computing nodes.

Epoch manager object 210 may also specify an epoch number, which may indicate an epoch of distributed operating system 10 in which computing node 200 previously participated. An epoch may refer to a version of distributed operating system 10 that was operational for some period of time. The epoch number allows for computing nodes 200 to coalesce on the most recently operational version of distributed operating system 10. Epochs are discussed in more detail below.

Epoch manager object 210 may further include an indication of whether computing node 200 has been selected as an epoch manager, and an indication of whether computing node 200 has been elected as the epoch manager master. Additionally, epoch manager object 210 may include an indication of whether computing node 200 has successfully joined the epoch (which is qualified by successfully writing data to one of the IPCB servers), and an indication of whether computing node 200 is successfully functioning as an epoch manager (which is qualified by successfully writing data to one of the IPCB servers).

Furthermore, epoch manager object 210 may include a restart request that requests restart of distributed operating system 10, either preserving the current epoch manager set or resetting the epoch manager set. Epoch manager object 210 may also include an indication that sets a maximum number of epoch manager capable computing nodes expected in the system, with a value of zero indicating that there is no set maximum.

To restate the above, epoch manager object 210 may include the following:

```
object EmNode {
    NodeID id;              // Node ID of publisher
    Int nonce;              // Random nonce
    Boolean emCapable;      // True if EM-capable
    Int emPriority;         // Priority for EM selection
    Boolean hwMaster;       // True if hardware master
    NodeID masterId;        // ID of nominated master, or 0
    Int masterPriority;     // Priority for EM Master election
    SysEpoch epoch;         // Local system epoch, or 0
    Boolean epochManager;   // True if node is epoch manager
    Boolean emMaster;       // True if node is epoch manager master
    Boolean epochUp;        // True if epoch is up
    Boolean managerUp;      // True if epoch manager is up
    Enum restartRequest;    // Restart request
    Int maxEmCapableNodes;  // Maximum # of EM-capable nodes, or 0
}
```

Each node updates its object in OFP whenever its contents change. All EM-capable computing nodes subscribe to these objects.

The fields have the following semantics:

| | |
|---|---|
| id | The node ID of the publishing node. This value is provided by OFP. |
| nonce | A random number generated by OFP when the node restarts. This value is compared to the value sent in the OFP reachability protocol. If it differs, it means that the node has been restarted and the object should be ignored. This effectively makes the object invisible if the publishing node restarts. |
| emCapable | Set to True if the node is Epoch Manager-capable. |
| emPriority | The publishing node's priority for Epoch Manager selection, or 0 if the node is not EM-capable. Higher priority nodes will be favored in choosing the set of Epoch Managers, providing for a way to bias the Epoch Manager function to particular nodes. |
| hwMaster | Set to True if the node owns hardware mastership (if it exists for this node type), or False if not. This is used in two-EM-capable-node systems to determine whether a quorum is present. |
| masterId | The node ID of the publishing node's nomination for Epoch Manager Master, or 0 if the node hasn't decided or is not EM-capable. |
| masterPriority | The publishing node's priority for Epoch Manager Master election. Higher priority nodes will be favored in the EM Manager election, providing a way to bias the EM Manager function to particular nodes. |
| epoch | The publishing node's understanding of the System Epoch, or 0 if the node hasn't joined an epoch. |
| epochManager | True if the publishing node has been selected as an Epoch Manager. |
| emMaster | True if the publishing node has been elected Epoch Manager Master. |
| epochUp | True if the publishing node has successfully joined the epoch (by virtue of having successfully written data into Zookeeper). |
| managerUp | True if the publishing node is functioning as an Epoch Manager (by virtue of having successfully written data into Zookeeper through the publishing node's server). |
| restartRequest | The node's restart request. The possible values are None, Restart, and ResetManagers. This is used for user-requested restarts (as opposed to forced restarts due to loss of quorum). A value of Restart preserves the previous EM manager set across the restart, and ResetManagers resets it. The latter is used to allow restarting after a failure causes the unrecoverable loss of EM-capable nodes such that a quorum of the previous manager set cannot be met (otherwise the system will never come back up). |
| maxEmCapableNodes | Set to the maximum number of EM-capable nodes expected in the system. This is set to 1 in single-EM-node systems, to 2 in dual-EM-node systems, and to 0 otherwise. |

Each node, including computing node 200, then sets its epoch manager object 210 to as follows:

| | |
|---|---|
| local.id | The node ID (provided by OFP). |
| local.nonce | The nonce (provided by OFP). |
| local.emCapable | Set to True if the node is Epoch Manager-capable. |
| local.emPriority | The publishing node's priority for Epoch Manager selection, or 0 if the node is not EM-capable. |
| local.masterId | 0. |
| local.masterPriority | The publishing node's priority for Epoch Manager Master election, or 0 if the node is not EM-capable or does not wish to be EM Master. |
| local.epoch | 0. |
| local.epochManager | False. |
| local.emMaster | False. |
| local.epochUp | False. |
| local.managerUp | False. |
| local.restartRequest | None. |
| local.maxEmCapableNodes | 0, 1, or 2 depending on the hardware configuration (all nodes in one- and two-node systems are expected to know that fact). |

Assuming computing node 200 has been configured as capable of operating as an epoch manager, SysEpochMan 16 receives each published epoch manager objects 210. SysEpochMan 16 may determine from epoch manager objects 210, which of the computing nodes capable of acting as epoch managers is to act as epoch manager master. SysEpochMan 16 may determine which of the computing nodes is to act as epoch manager master based on the epoch manager master priority of each epoch manager objects 210 after waiting some period of time (denoted as "EmWaitTime") to allow for the arrival of objects (and to avoid recently restarted computing nodes from immediately electing themselves as epoch manager master). SysEpochMan 16 may also delete any IPCB state information, before proceeding to execute an object event process.

All computing nodes, including SysEpochMan 16 of computing node 200, may execute the object event process at startup or whenever any EmNode object 210 or EmMaster object 212 (which is another way of referring to epoch manager master object 212) it subscribes to changes, including its own. Non-EM-capable computing nodes do not execute the object event process when updating the local copy of the EmNode object, since they do not subscribe to them.

When a computing node updates an object in the object event process, the computing node executes the object event process again (since its own object has changed) as long as it is subscribed to the scope into which that object is published. This repeats until no object is updated. When the computing node restarts in the procedure below, the computing node exits the object event process.

Early in the object event process, SysEpochMan 16 selects a single EmMaster object 210 (if such an object 210 exists). The object even process may reference an epochState field, which may be set to any of the following:

| | |
|---|---|
| EpochStart | The initial state. In some sense this isn't the Epoch state, but rather the state of the elected EM Master, which is trying to decide how to proceed. The Epoch Manager Master has been elected and is waiting for a quorum of EM-capable nodes to arrive. The EM Master does not publish an EmMaster object in this state so that any old EmMaster object continues to persist. Transitions to state EpochInit when a quorum of EM-capable nodes forms. Transitions to state EpochFail if any node requests a system restart. |
| EpochInit | The Epoch is initializing. A quorum of EM-capable nodes is reachable in OFP but not all selected Epoch Managers are ready. Transitions to state EpochRunning when a quorum of nodes selected as Epoch Managers are ready. Transitions to state EpochFail if the quorum of EM-capable nodes fails or any node requests a system restart. |
| EpochRunning | The epoch is up. Higher layers have started and the system is running. Transitions to state EpochReconfig when the EM Master decides to change the set of EM nodes. Transitions to state EpochFail if the EM quorum fails or any node requests a system restart. |
| EpochReconfig | The set of EM nodes is being reconfigured by the EM Master but has not yet completed. The system continues to run, although Zookeeper state changes stall. Transitions to state EpochRunning when a quorum of the selected Epoch Managers are ready. Transitions to state EpochFail if the quorum of the selected Epoch Managers fails or any node requests a system restart. |
| EpochFail | The epoch has failed due to lost quorum or full-system restart. A new epoch will be created and this one will be destroyed. |

The object event process may operate with respect to the selected object as follows:

```
    (Perform local housekeeping:)
|   If there are one or more existing EmNode objects for which local.id == remote.id and
    local.nonce != remote.nonce, delete the objects (the local node has restarted).
|   If there are one or more existing EmNode objects (other than the local object) for which
    local.id == remote.id and local.nonce == remote.nonce, restart the node (as an error has
    occurred necessitating restart).
    (Choose the EmMaster object:)
|   If there is at least one EmMaster object present:
|   |   Select the best EmMaster object. As there may be more than one (due to the
        asynchronous nature of OFP), prefer objects where master.epochState != EpochFail,
        then prefer objects with the highest value of master.epochPreference, and then prefer
        objects with the highest value of master.masterId. This may cause all nodes to
        converge to a single EmMaster object and chooses the "best" epoch if more than one
        are present. and ignores failed epochs if there are any epochs that have not failed.
    (Set/validate the system epoch:)
|   |   If local.epoch == 0: and master.epochState != EpochFail
        |   |   |   Set local.epoch = master.masterEpoch.
        |   |   Else if local.epoch != 0: (already part of an epoch)
|   |   |   If local.epoch != master.masterEpoch, restart the node. This means that the epoch
            has changed.
|   |   |   If master.epochState == EpochFail, restart the node. This means that the epoch has
            failed and the system is being restarted.
|   |   |   If master.epochState == EpochRunning and local.epochUp == True and the upper
            layers are not yet running, start the upper layers with the OFP Domain and
            Zookeeper parameters in the EmMaster object. This means that the system has
            come up.
    (Update the set of EM managers used for detecting Epoch Up:)
|   |   If local.epochUp == False and local.epoch != 0:
|   |   |   Reset any previous Zookeeper Client session to the set of nodes in
            master.managers (the set of managers may have changed).
|   |   |   Open a Zookeeper Client session to the set of nodes in master.managers as servers
            via the master.zkClientPort port.
|   |   |   Post a Zookeeper write to "/SysEpochMan/EpochRunning/<id>", where <id> is a
            textual representation of the publisher's node ID. If and when this write completes,
            it will result in an Epoch Up event.
|   |   |   Post a Zookeeper getChildren watch to "/SysEpochMan/SystemEpoch/". If and
            when this read completes, it will result in a Zookeeper Epoch event.
        (All nodes see if quorum has been lost:)
|   If local.epochUp == True and the quorum of EM nodes has failed (see section 8.4.11
    below), restart the node. If local.emMaster == True (this node is EM Master), set
    master.epochState = EpochFail and publish the updated EmMaster object before
    restarting. This means that the network has partitioned or too many EM nodes have
    failed and the epoch must be abandoned, and we need the EM Master to signal that fact.
        (Non-EM-capable nodes exit here, the exception being a node that wants to
gracefully shut down but is currently an Epoch Manager. Such nodes continue in their EM
role until they are dismissed by the EM Master:)
|   If local.emCapable == False and local.epochManager == False, exit the Object Event
    Process (the node is not EM-capable or has been relieved of its duties as Epoch
    Manager because it is shutting down).
        (All EM-capable nodes perform EM mastership election:)
|   Set local.masterId to the ID of the node that reports its own ID in remote.masterId with
    the highest value of remote.masterPriority, then the lowest node ID. If there is no such
    node, choose the ID of the node for which remote.emCapable == True with the highest
    value of remote.masterPriority, then the lowest node ID. Use 0 if there is no such node.
    (Note that if a node has become unreachable, its EmNode object is hidden, so only
    reachable nodes will be considered.)
        (All EM-capable nodes see if their EM status has changed:)
|   If local.epochManager == False and master.managers contains (local.id, local.nonce):
    (becoming Epoch Manager)
        |   |   Set local.managerUp = False.
        |   |   Set local.epochManager = True.
|   |   Write the set of reachable servers in master.managers to the IPCB server
        configuration file.
|   |   Erase any local persistent IPCB Server state.
|   |   Launch a local IPCB Server on the ports specified in master.zkServerPort and
        master.zkElectionPort. If the size of master.managers is 1, start IPCB in Standalone
        mode; otherwise, start it in Replicated mode.
|   |   Open a IPCB Client session to the node local.id. as server via the master.zkClientPort
        port and post a IPCB write to "/SysEpochMan/ManagerUp/<id>", where <id> is a
        textual representation of the publisher's node ID. If and when this write completes, it
        will result in a Manager Up event.
|   Else if local.epochManager == True and master.epochState != EpochReconfig and
    master.managers does not contain (local.id, local.nonce): (no longer Epoch Manager)
        |   |   Set local.managerUp = False.
        |   |   Set local.epochManager = False.
```

```
|  |  Shut down any local IPCB server.
|  |  Close any client session for Manager Up events.
      (Switch IPCB between Standalone and Replicated modes if appropriate:)
|  Else If local.epochManager == True and master.managers contains (local.id local.nonce):
   (already Epoch Manager)
|  |  If the size of master.managers is 1 and IPCB 18 is running in Replicated mode:
|  |  |  Write the server in master.managers to the IPCB server configuration file.
|  |  |  Relaunch the local IPCB Server in Standalone mode on the ports specified in
         master.zkServerPort and master.zkElectionPort.
|  |  Else If the size of master.managers is greater than 1 and IPCB is running in
      Standalone mode:
|  |  |  Write the set of reachable servers in master.managers to the IPCB server
         configuration file.
|  |  |  Relaunch the local IPCB Server in Replicated mode on the ports specified in
         master.zkServerPort and master.zkElectionPort.
      (Perform EM Master duties if appropriate)
      If local.masterId == local.id: (this node is or just became master)
|  If any local.emMaster == False: (becoming master)
|  |  |  If any remote.masterId != local.id, exit the Object Event Process. This means that
         the election of the local node is not yet unanimous.
|  |  |  If master.epochState == EpochFail and master.managers is not empty and a
         quorum (see section 8.4.10) of the nodes in master.managers are not reachable
         (ignoring the nonce values), exit the Object Event Process. This means that we may
         have been partitioned and so do not want to advance the Epoch, lest we cause split
         brain.
|  |  |  If any EmMaster object exists with master.masterId == local.id, delete it (clean up
         old EmMaster objects from this node).
|  |  |  Set local.emMaster = True.
|  |  |  Initialize the local EmMaster object according to section 8.4.12.
|  |  Update the EmMaster state according to section 8.4.13.
|  |  If master.epochState != EpochStart:
|  |  |  If it has changed, update the EmMaster object in OFP.
|  |  |  If any EmMaster object exists with master.masterId != local.id, delete it (clean up
         old EmMaster objects from other nodes).
```

The elected epoch manager master (assuming for the sake of explanation that this is computing node 200) may, upon being elected, publishes an epoch manager master object 212 into OFP domain 0. The epoch manager master object 212 may include the following information.

```
Object EmMaster {
   NodeID masterId;         // Node ID of publisher (the EM Master)
   SysEpoch masterEpoch;    // Global system epoch
   Int epochPreference;     // Epoch preference
   Int zkClientPort;        // Zookeeper client port
   Int zkServerPort;        // Zookeeper server port
   Int zkElectionPort;      // Zookeeper leader election port
   Int ofpDomain;           // OFP domain ID
   Enum epochState;         // Epoch state
   (NodeID, Int) managers[ ];     // Selected EMs and their nonces
   (NodeID, Int) oldManagers[ ];  // Previous EMs and their nonces
   Int maxManagerCount;     // Max number of Epoch Managers expected
   Int epochQuorum;         // EM Quorum size
   Int oldQuorum;           // Previous EM Quorum size
}
```

The EM Master updates this object in OFP whenever its contents change and epochState !=EpochStart. All computing nodes subscribe to this object.

The fields have the following semantics:

| | |
|---|---|
| masterId | The node ID of the publishing node. This value is provided by OFP. |
| masterEpoch | The current global system epoch value. |
| epochPreference | The preference value for this epoch. If multiple EmMaster objects are present, all nodes choose the one with the highest preference value. This is used to preserve the "best" partition epoch when healing split brain situations. |
| zkClientPort | The TCP port number used for client access to Zookeeper. |
| zkServerPort | The TCP port number used between Zookeeper servers for data transfer. |
| zkElectionPort | The TCP port number used between Zookeeper servers for leader election. |
| ofpDomain | The OFP domain ID to be used. |
| epochState | The state of the epoch. The possible states are EpochStart, EpochInit, EpochRunning, EpochReconfig, and EpochFail. |
| managers | The set of (node ID, nonce) tuples of the nodes chosen to be Epoch Managers. A particular node is considered to be in the managers list only if it is reachable and both its id and nonce values match the values in its EmNode object. |
| oldManagers | The set of (node ID, nonce) tuples of the EM nodes that were running and reachable at the time of the last reconfig event. A quorum of these nodes (as defined by oldQuorum) must remain reachable during the reconfiguration to avoid failure. |

| | |
|---|---|
| maxManagerCount | The maximum number of Epoch Managers expected. |
| epochQuorum | The size of the Epoch Manager quorum. |
| oldQuorum | The size of the Epoch Manager quorum at the time of the last reconfig event. |

All computing node state information (which may also be referred to as "state") may be reflected in the objects published, and computing node 200 stores little local state. In other words, the internal state for computing node 200 is reflected in the computing node's EmNode object (which is another way to refer to epoch manager object 210), and the internal state for the Epoch Manager Master is reflected in the EmMaster object (which is another way to refer to epoch manager master object 212). In some instances, SysEpochMan 16 may only store an internal copy of the last version of each EmNode object 210 SysEpochMan 16 most recently publishes. The EM Master may use the contents of the published EmMaster object, since it is transferred between computing nodes when mastership changes.

In describing the elements of procedure, updating a named object field should be understood to be updating the internal copy, where SysEpochMan then publishes as an updated object at the end of the process in the event any changes are made to the local copy. Moreover, fields in the locally-produced EmNode object 210 are referred to as local.X, where X is the field name. Fields in EmNode objects from other computing nodes are referred to as remote.X, where X is the field name. Fields in the EmMaster object 212 are referred to as master.X, where X is the field name.

The procedure is defined for individual computing nodes. However, acting in concert, the collection of computing nodes may indirectly define the global behavior. Furthermore, the procedure is defined as a set of possible events, each of which triggers a process, and each of which may result in updating of published objects. The possible events are:

| | |
|---|---|
| Object Event | A change has occurred in the set of EmNode and EmMaster objects or node reachability has changed. |
| Epoch Up | The epoch is up on the node (IPCB 18 is functional). |
| Manager Up | The node has become a fully functional as an Epoch Manager (the local IPCB Server is functional). |
| System Restart | An agent within the node has requested that the entire system restart, abandoning the current System Epoch. |
| Node Shutdown | An agent within the node has requested that the node shut down gracefully. |
| IPCB Epoch | A watch on the System Epoch value within IPCB has fired. This provides a means to ensure that the same IPCB plane is not bound to two System Epoch values. |
| Mastership Change | The hardware mastership status of the node changed (for nodes that have such hardware). |

After computing node 200 publishes epoch manager object 210 and determines that computing node 200 is epoch manager master (under the above assumption), SysEpochMan 16 may wait for at least a quorum of epoch manager capable computing nodes to publish epoch manager objects 210. SysEpochMan 16 may determine the size of the epoch manager quorum in, as one example, the following way:
If master.maxManagerCount>=3, or master.maxManagerCount==1, a quorum is master.epochQuorum nodes.
If master.maxManagerCount==2, a quorum is master.epochQuorum nodes with one node reporting remote.hwMaster==True (or, conversely, a single node without remote.hwMaster==True is not a quorum).

Once the quorum is reached, SysEpochMan 16 may publish epoch manager master object 212 with an epochState field set to "EpochInit," which initiates a new epoch. SysEpochMan 16 may perform the epoch manager master initialization process to initialize state of epoch manager master object 212 as follows.

| | |
|---|---|
| masterId | The node ID (provided by OFP). |
| masterEpoch | The old value of master.masterEpoch, or a random number if there is no old EmMaster object. |
| epochPreference | The old value of master.epochPreference, if an old EmMaster object exists. In general this value should represent the "goodness" of a partition if more than one exists, so that the "best" partition survives; this should probably be based on the number of objects in OFP Domain X, or perhaps the number of reachable OFP nodes, or some combination thereof. |
| zkClientPort | The old value of master.zkClientPort, or a value derived as described below if there is no old EmMaster object. |
| zkServerPort | The old value of master.zkServerPort, or a value derived as described below if there is no old EmMaster object. |
| zkElectionPort | The old value of master.zkElectionPort, or a value derived as described below if there is no old EmMaster object. |
| ofpDomain | The old value of master.ofpDomain, or a value derived as described below if there is no old EmMaster object. |
| epochState | The old value of master.epochState, or EpochStart if there is no old EmMaster object. |
| managers | The old value of master.managers, or the empty set if there is no old EmMaster object. |
| oldManagers | The old value of master.oldManagers, or the empty set if there is no old EmMaster object. |
| maxManagerCount | The old value of master.maxManagerCount. If there is no old EmMaster object, use the largest value of any remote.maxEmCapableNodes. If that value is 0, use 3. |

| | |
|---|---|
| epochQuorum | The old value of master.epochQuorum. If there is no old EmMaster object, use the value (master.maxManagerCount/2) + 1. (XXX should be 1 for hw mastership nodes) |
| oldQuorum | The old value of master.oldQuorum, or 0 if there is no old EmMaster object. |

The epoch manager master computing node may next update the epoch manager master state.
The local copy of the state is updated, but that state is written back into OFP as an updated object only when explicitly mentioned. The EM Master computing node updates the EmMaster state as follows:

```
|    Update the value of master.epochPreference. Note that this value
should not change often, and in particular cannot change on every cycle of
the Object Event Process or it will never converge (each update will
trigger a new Object Event). See section 8.4.12 for a discussion of how
this might be set.
(See if any computing node is requesting a restart.)
|    If any remote.restartRequest != None and remote.epoch ==
master.masterEpoch or remote.epoch == 0: (some node is requesting
restart)
|    |    Set master.epochState = EpochFail.
|    |    If remote.restartRequest == ResetManagers set
master.managers = <empty set>.
|    |    Update the EmMaster object and exit the Object Event Process.
(Manage the Epoch Manager set.)
|    Switch on master.epochState:
|    |    Case EpochStart:
|    |    |    If a quorum (see section 8.4.10) of nodes for which
remote.emCapable == True are reachable via OFP: (enough nodes to
form a quorum)
|    |    |    |    Set master.epochState = EpochInit.
|    |    Case EpochInit:
|    |    |    Update the Epoch Manager set according to section
8.4.14.
|    |    |    If less than a quorum of nodes (see section 8.4.10) for
which remote.emCapable == True are reachable via OFP, set
master.epochState = EpochFail.
|    |    |    If a quorum of nodes (see section 8.4.10) in
master.managers are reachable via OFP and each is reporting
remote.managerUp and remote.epoch == master.masterEpoch, set
master.epochState = EpochRunning.
|    |    Case EpochRunning:
|    |    |    If less than a quorum (see section 8.4.10) of nodes in
master.managers are reachable via OFP:
|    |    |    |    Set master.epochState = EpochFail.
|    |    |    Else: (a quorum is reachable)
|    |    |    |    Update the Epoch Manager set according to section
8.4.14. If master.managers changes, set master.epochState =
EpochReconfig.
|    |    Case EpochReconfig:
|    |    |    If less than a quorum (see section 8.4.10) of nodes in
master.managers are reachable via OFP: (the new EM set has lost
quorum)
|    |    |    |    Set master.epochState = EpochFail.
|    |    |    Else if less than a quorum as defined by
master.oldQuorum (see section 8.4.10) of nodes in
master.oldManagers are reachable via OFP: (the old EM set has
lost quorum)
|    |    |    |    Set master.epochState = EpochFail.
|    |    |    Else: (a quorum is reachable)
|    |    |    |    If a quorum of nodes (see section 8.4.10) in
master.managers are reachable via OFP and each is reporting
remote.managerUp and remote.epoch == master.masterEpoch,
set master.epochState = EpochRunning.
```

If there is no old EmMaster object, SysEpochMan 16 may generate new values for the System Epoch, the IPCB ports, and the OFP Domain ID. For the System Epoch, SysEpochMan 16 may select a random number out of a number space large enough (64 bits) to make the probability of collision unlikely (less than 0.1%), and set that value for the OFP Domain ID.

However, the port number space is much smaller, and as such SysEpochMan 16 may select a random number divisible by three that lies in the port range, assigning that value to the client port, the value+1 to the server port, and the value+2 to the election port. The System Epoch is written into IPCB itself, and if more than one epoch is ever bound to the IPCB plane, it will be detected and the system restarted. The newly-elected epoch manager master posts an IPCB write "/SysEpochMan/SystemEpoch/<epoch>", where <epoch> is a character representation of the new System Epoch. Each computing node may listen for changes on this path and requests a system restart if a conflict is detected.

SysEpochMan 16 may next wait for the quorum of epoch manager computing nodes to configure IPCB 18, forming the IPCB ensemble and then successfully executing IPCB 18 (as indicated by a quorum of epoch manager computing nodes announcing a remote.managerUp with a Boolean value set to true. Upon successfully executing IPCB 18, SysEpochMan 16 may bind the IPCB plane to a system epoch, initiating an IPCB epoch event.

Each computing node executes an IPCB epoch process in response to this IPCB epoch event, which may result in updated objects being published to OFP domain 0 (as is, in some examples, always the case). The process is as follows:

```
|    Call getChildren on the "/SysEpochMan/SystemEpoch/" path,
requesting a new watch.
|    If local.epoch != 0 and any child exists with a different value than
local.epoch:
|    |    Set local.restartRequest = Restart.
```

After successfully executing IPCB 18, SysEpochMan 16 may update the local copy of epoch manager master 212 to update epochState to a value of "EpochRunning," and publish the updated local copy of epoch manager master 212. At this point, distributed operating system 10 has coalesced (or, in other words, is operational) and may support execution of application specific functions, like SysMan 20, distributor 22, application specific OFP domains, and applications. SysEpochMan 16 may change the set of epoch manager computing nodes at any time by specifying a new set of epoch manager computing nodes via the managers field of epoch manager master object 212 with the epochState field of the epoch manager master object 212 set to "EpochReconfig."

SysEpochMan 16, acting as epoch manager master, may also maintain the set of epoch manager computing nodes. Epoch manager master computing node may ensure that IPCB 18 state maintains coherence, which means potentially ensuring that there is always at least one computing node in common between epoch manager sets. Epoch manager master may also maintain the number of epoch managers in the system, increasing and decreasing the count as the set of computing nodes changes.

The inputs to the epoch manager management process are the set of reachable epoch manager-capable computing nodes and the previous epoch manager master state. The epoch manager master may ensure the existing epoch manager set is preserved while honoring any computing nodes with higher epoch manager priority (which will remove computing node of lower epoch manager priority from the set of epoch managers). In order to satisfy the coherence requirements of IPCB dynamic reconfiguration, SysEpochMan 16 may ensure that there is at least one computing node in common in the old and new epoch manager sets. SysEpochMan 16 may iterate, when necessary, forming intermediate epoch manager sets under the at least one common computing node rule, until the new epoch manger set is formed.

The process is as follows:

```
First, calculate the new value of master.maxManagerCount:
|   Set roughCount = (number of reachable EM-capable nodes/3) | 1
|   Set minCount = Min(master.maxManagerCount, 3)
|   Set master.maxManagerCount = Min(Max(roughCount, minCount),
      7)
```

In the above calculation, roughCount may represent a rough approximation of the desired number of epoch manager (EM) computing nodes based on the total number of EM-capable nodes. The low order bit is set to guarantee that it is odd (and nonzero). Next, minCount is the lowest possible target number of EM nodes, which is the lesser of 3 and the current number (so as to accommodate one- and two-EM-node systems). Finally, SysEpochMan 16 may select the larger of the rough count and the minimum count, but limit the larger of the two to 7 as the value of additional EM nodes adds little value and may result in processing delays. In some examples, one and two-EM-node systems without mastership hardware may end up with master.maxManagerCount==1, two-EM-node systems with mastership hardware will always end up with master.maxmanagerCount==2, and all other systems will end up with an odd number in the range of three to seven.

Next, SysEpochMan 16, acting as epoch manager master, may select a new value of master.managers as follows:

```
|   Set the prospective manager set to all OFP-reachable members of master.managers
reporting remote.managerUp == True. If there are more than master.maxManagerCount
members, drop enough members with the lowest values of remote.emPriority to trim the
size of the set.
|   Add all reachable EM-capable nodes with remote.epoch == master.masterEpoch
whose value of remote.emPriority is greater than any members of the prospective manager
set, if necessary replacing the existing members with the lowest values of remote.emPriority
in order to keep the size of the set less than or equal to master.maxManagerCount.
|   If the prospective manager set does not include any node in master.managers
reporting remote.managerUp == True, replace the prospective member that has the lowest
value of remote.emPriority with the reachable current member that has
remote.managerUp == True and the highest value of remote.emPriority.
|   Set master.oldManagers to master.managers.
|   Set master.managers to the prospective manager set.
|   Set master.oldQuorum to master.epochQuorum.
|   Set master.epochQuorum to (master.maxManagerCount/2) + 1.
```

One effect of the foregoing process is to keep the manager set stable, while potentially favoring higher priority EM-capable nodes when they arrive. If the resulting set does not overlap the current set, SysEpochMan 16 may select one out of the current set (because the IPCB Server sets must, in some instances, always overlap to preserve the shared file system). The value of master.epochQuorum may be set to 1 for one- and two-EM systems, and will be at least 2 for larger systems.

Each node, including computing node 200, supporting execution of distributed operating system 10 may also individually monitor the health of epoch manager nodes participating in the quorum. Detection of failure of the quarum does not occur when the node has not yet determined that the epoch is operational or when the epoch is in state "EpochReconfig" as the quorum has not yet stabilized. The process by which to detect the failure of the quorum is as follows:

```
|   If there is no EmMaster object, exit with No Failure.
|   If local.epochUp == False, exit with No Failure.
|   If master.epochState == EpochReconfig, exit with No Failure.
|   Determine the number of reachable in-epoch EM nodes by
counting all reachable EmNode objects in which remote.epoch ==
master.masterEpoch and remote.managerUp == True.
|   If the node count is less than master.epochQuorum, exit with
Failure.
|   If the node count is 1 and mastermaxManagerCount == 2 and
local.hwMaster == False, exit with Failure. (The network is
partitioned and the local node is not hardware master.)
|   Otherwise, exit with No Failure.
```

When the quorum fails, the monitoring computing nodes will detect the failure and restart. Quorum validation may depend on the epoch state published via the epoch manager master object 212. For example, in state "EpochInit," the set of epoch manager is converging, so a failure is detected by a loss of quorum among the set of OFP-reachable epoch manager computing nodes. In state "EpochRunning," the computing nodes may detect failure by a loss of quorum among the set of epoch manager computing nodes reporting remote.managerUp. In state "EpochReconfig," the new set of epoch managers is still converging, and the computing nodes detect failure when a loss of quorum occurs among the set of epoch manager nodes.

In view of the above, which assumes that an epoch existed prior to startup, there are some considerations for the initial startup. During the initial startup, none of the nodes maintain either an epoch manager object 210 or an epoch manager master object 212. As such, all nodes start up asynchronously and publish initial epoch manager objects 212, where the first epoch manager capable node elects itself as the epoch manager master. The other nodes then follow the self-elected epoch manager master node. At this point, each node has local.epoch equal to zero since no epoch has yet been created.

The self-elected epoch manager master stays in the "EpochStart" state, and does not publish any updates to the EmMaster field of the epoch manager master object 212 until a quorum of epoch manager capable nodes announce themselves via epoch manager objects 210 and unanimously agree on the identity of the epoch manager master node. In some instances (such as race conditions), more than one node may elect itself as epoch manager master. The process may not advance until mastership converges.

Assuming mastership converges with computing node 200 electing itself as epoch manager master, SysEpochMan 16 of computing node 200 publishes epoch manager master object 212 with the new system epoch (e.g., a value of 1), the new set of epoch managers, and an EpochInit state. All nodes may then update their respective epoch manager objects 210 with the new epoch, publishing the updated epoch manager objects 210 to confirm initialization of the new epoch. The newly elected epoch manager nodes execute IPCB 18.

All nodes next post a write to IPCB 18 (with the full set of epoch managers acting as IPCB servers) in order to detect successful execution of IPCB 18. All epoch manager nodes may also write to IPCB 18 (with themselves as the only server) to detect success at joining the IPCB ensemble. As the IPCB ensemble converges, the pending IPCB writes will complete, resulting in all nodes publishing via epoch manager objects 210 an epochStatus of "epochUp," and the epoch manager nodes publishing a "managerUp" status.

Every node executes the epoch up process when an epochUp event occurs (meaning when epochState indicates a value of "epochUp"). The epochUp event is triggered by the asynchronous completion of a write into IPCB 18 in the object event process described above with all EM nodes as servers, indicating that an IPCB quorum for the epoch has successfully formed. As usual, if this process modifies any object, it is updated in OFP. The process is as follows:

Set local.epochUp=True.

Once a quorum of epoch managers reaches the managerUp state, all nodes perform the following manager up process. Every node selected as an Epoch Manager may execute the Manager Up process when a managerUp event occurs. This event is triggered by the asynchronous completion of a write into IPCB 18 in the object event process with only the local node as a server, indicating that the local node has successfully joined the IPCB quorum. If this process modifies any object, it is updated in OFP. The process is as follows:

Set local.managerUp=True.

After performing the manager up process, the epoch manager master node publishes an updated epoch manager master object 212 with epochState set to a value of "EpochRunning." In response to the updated epochState of "EpochRunning," each node then executes the upper layers of software stack 11.

Furthermore, OFP 14 (executed by one or more processors implemented in digital logic circuitry, not shown in FIG. 3) includes state 208. State 208 includes a data structure, such as a tree data structure (e.g., a radix trie) storing a plurality of objects, each of the objects defining a portion of state information for at least one of distributed operating system 10 or an application executed in an application space provided by distributed operating system 10.

In general, computing node 200 (more particularly, the one or more processors) forms the tree data structure for state 208 to include a plurality of hierarchically arranged tree nodes, each of the tree nodes storing data for a message fragment including, e.g., a digest and a fragment ID. The tree data structure for state 208 may be arranged according to the fragment IDs of the tree nodes.

Computing node 200 may be configured to synchronize state 208 with corresponding data structures of other nodes executing other instances of distributed operating system 10. In general, state 208 may be considered synchronized with data structures of the other nodes executing the other instances of distributed operating system 10 when tree data structures of each of the nodes executing instances of distributed operating system 10 have a common arrangement and interconnection of tree nodes within each of the tree data structures, and when corresponding tree nodes of the tree data structures have the same digest values.

Computing node 200 may further determine whether or not state 208 is synchronized with state data structures of other nodes executing other instances of distributed operating system 10. Computing node 200 may recursively walk the tree nodes of a tree data structure representing state 208. If local digests of tree nodes of the tree data structure representing state 208 match digests of corresponding tree nodes of tree data structures of nodes executing other instances of distributed operating system 10, computing node 200 may determine that the tree nodes are synchronized. Otherwise, computing node 200 may determine that an update to state 208 is necessary.

If an update is necessary, computing node 200 may determine whether its version of state 208 is most current, or if another version of a tree data structure storing state information of a different node executing another instance of distributed operating system 10 is most current. If the version of a tree node of a tree data structure representing state 208 of computing node 200 is most current (e.g., has a most current logical clock value), computing node 200 may send message fragment data for the tree node of the tree data structure representing state 208 to one or more of the other nodes executing other instances of distributed operating system 10. Otherwise, if the version of the tree node of the tree data structure representing state 208 of computing node 200 is not most current, computing node 200 may receive message fragment data for the tree node of the tree data structure representing state 208 from a different one of the other nodes executing another instance of distributed operating system 10 that is most current, and update the tree node of the tree data structure representing state 208 with the received message fragment data.

FIGS. 4A-8B are block diagrams illustrating various aspects of node operation within the multi-chassis router shown in FIG. 2 in addressing various scenarios that may impact execution of the distributed operating system maintained in accordance with the techniques described in this disclosure. FIGS. 4A-4D are block diagrams illustrating operation of nodes 302A-302F ("nodes 302") in addressing epoch manager failures during execution of the distributed operating system in accordance with various aspects of the techniques described in this disclosure. Each of nodes 302 may be substantially similar to computing node 200 shown in FIG. 3.

Figure 4A:
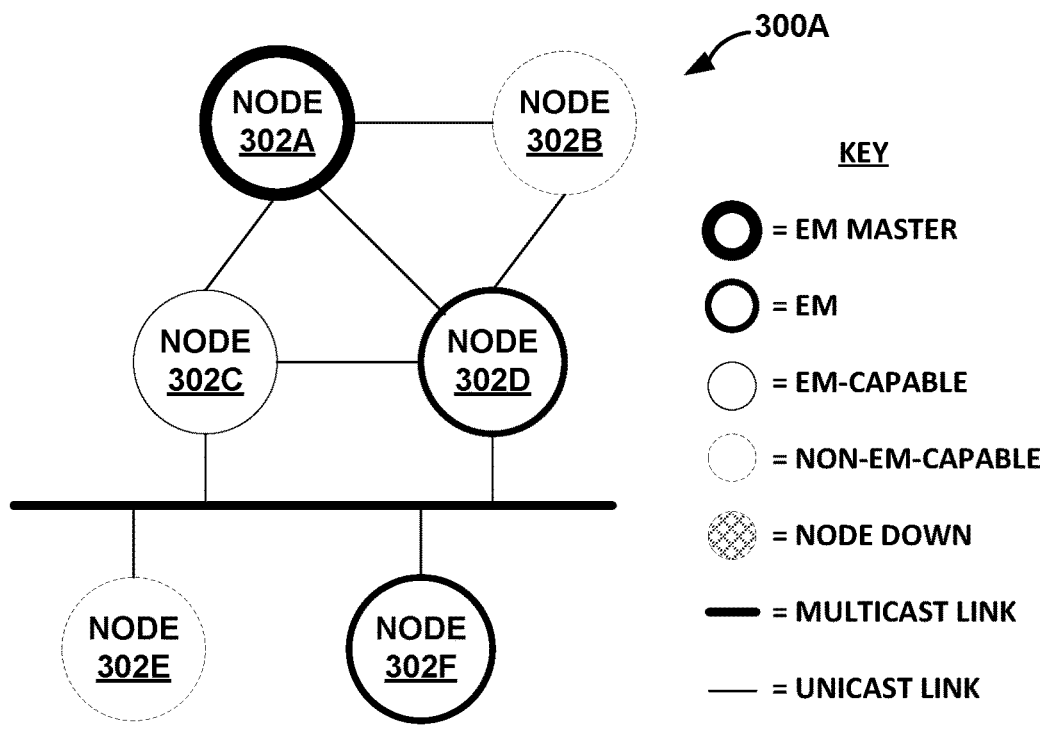
FIG. 4A-8B are block diagrams illustrating various aspects of node operation within the multi-chassis router shown in FIG. 2 in addressing various scenarios that may impact execution of the distributed operating system maintained in accordance with the techniques described in this disclosure.

In the example of FIG. 4A, nodes 302 may collectively execute distributed operating system 300A with node 302A operating as the epoch manager master ("EM master"), node 302D and 302F operating as elected epoch managers ("EMs"), node 302C operating as an unelected epoch manager, but epoch manager-capable ("EM-capable"), and nodes 302B and 302E operating as non-EM-capable. The heavier weighted lines interconnecting nodes 302 may represent multicast (or, in some instances, broadcast) links, while the less heavier weighted lines interconnecting nodes 302 may represent unicast links.

The state of distributed operating system 300A is "epochRunning," with a quorum of three nodes (i.e., nodes 302A, 302D, and 302F in the example of FIG. 4A) executing as IPCB servers. As such, the quorum may be maintained so long as two of the three nodes (given that (3/2)+1=2)

forming the quorum remain operational. In other words, distributed operating system 300A may remain operational despite failure of one of nodes 302A, 302D, and 302F forming the quorum.

Figure 4B:
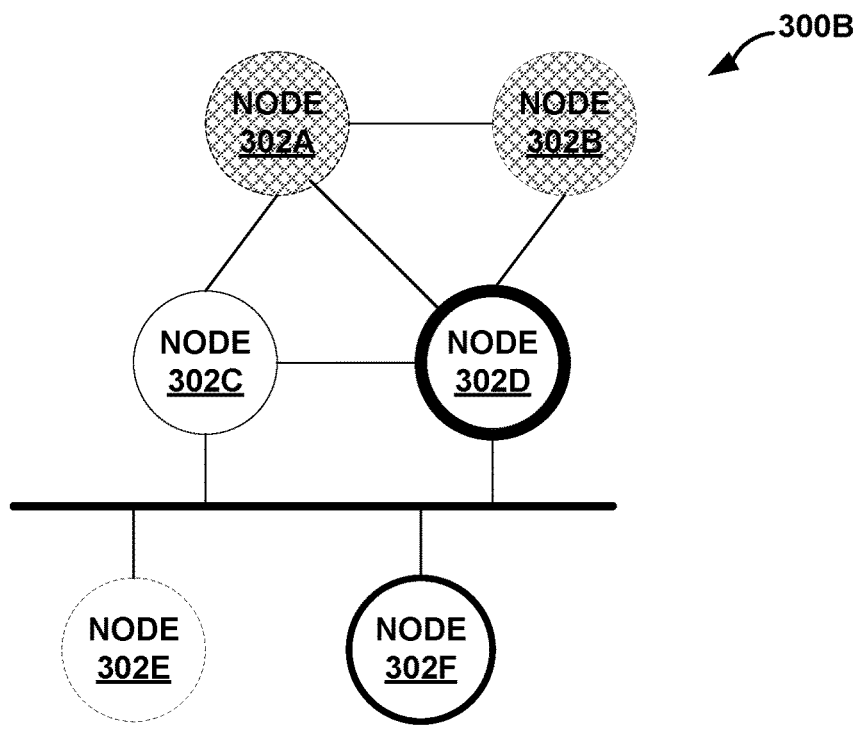
Figure 4C:
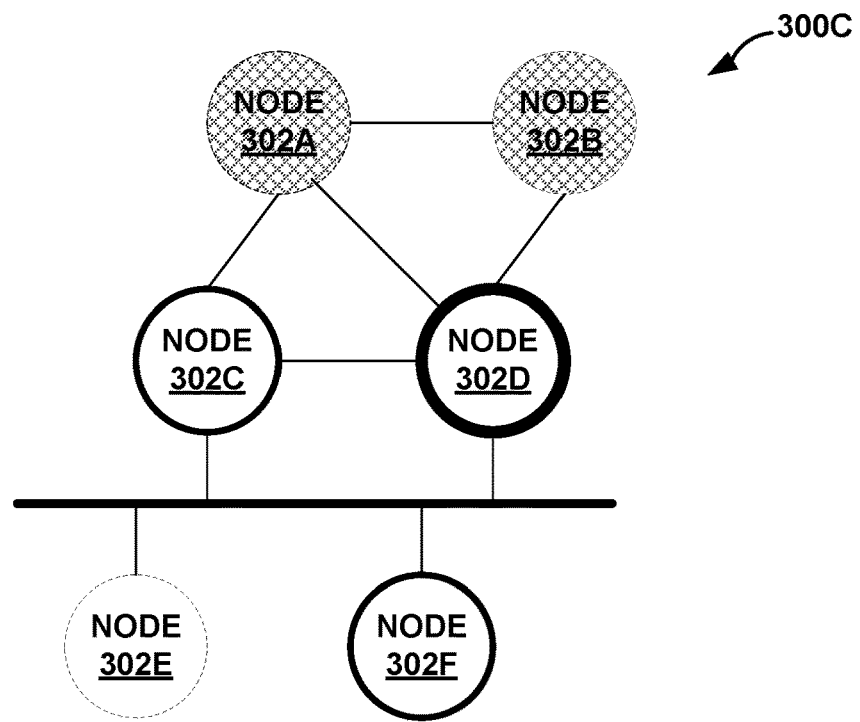

In the example of FIG. 4B, nodes 302A and 302B fail resulting in distributed operating system 300B. However, because two epoch managers (i.e., nodes 302D and 302F in the example of FIG. 4B) remain operational, distributed operating system 300B may maintain state information coherence and continue to execute. Given that epoch manager master node 302A failed, distributed operating system 300B elects node 302D as epoch manager master.

Given that the quorum only includes two nodes, the quorum cannot lose another epoch manager node while still maintaining operation of distributed operating system 300B. As such, epoch manager master node 302D may reconfigure the epoch manager set to include node 302C using the above described process. In electing EM-capable node 302C to operate as an epoch manager, node 302C may execute as an IPCB server and copy all IPCB state to a local IPCB server executed by node 302C, resulting in distributed operating system 300C.

Figure 4D:
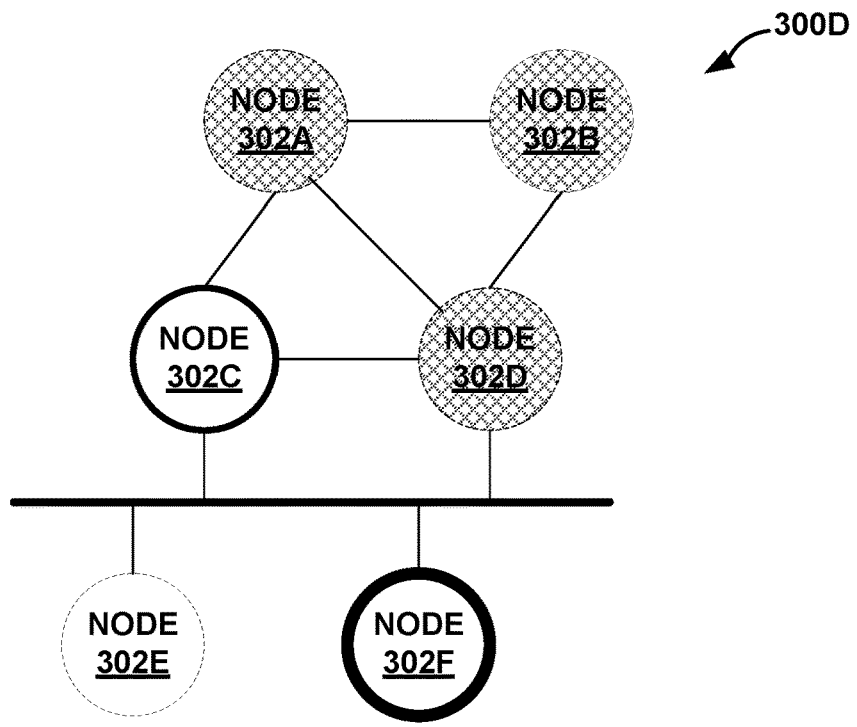

In the example of FIG. 4D, it is assumed that nodes 302A, 302B, and 302D all fail at the same time (i.e., transitioning from distributed operating system 300A of FIG. 4A to distributed operating system 300D shown in FIG. 4D in this example). Losing nodes 302A, 302B, and 302D, distributed operating system 300D loses the quorum of epoch managers (and IPCB servers).

As such, it is possible that an IPCB client could have written to IPCB servers, and received an acknowledgement that such state was written to IPCB, but that the state was only present at nodes 302A and 302D at the time of failure. In this scenario, the state is unrecoverable (or, in other words, lost), and as such, distributed operating system 300D fails, restarting one or more layers in software stack 11 of distributed operating system 300D. As nodes 302 reboot, nodes 302 converge on a new value of the system epoch, resulting in distributed operating system 300D with node 302F acting as epoch manager master and node 302C acting as epoch manager.

Figure 5A:
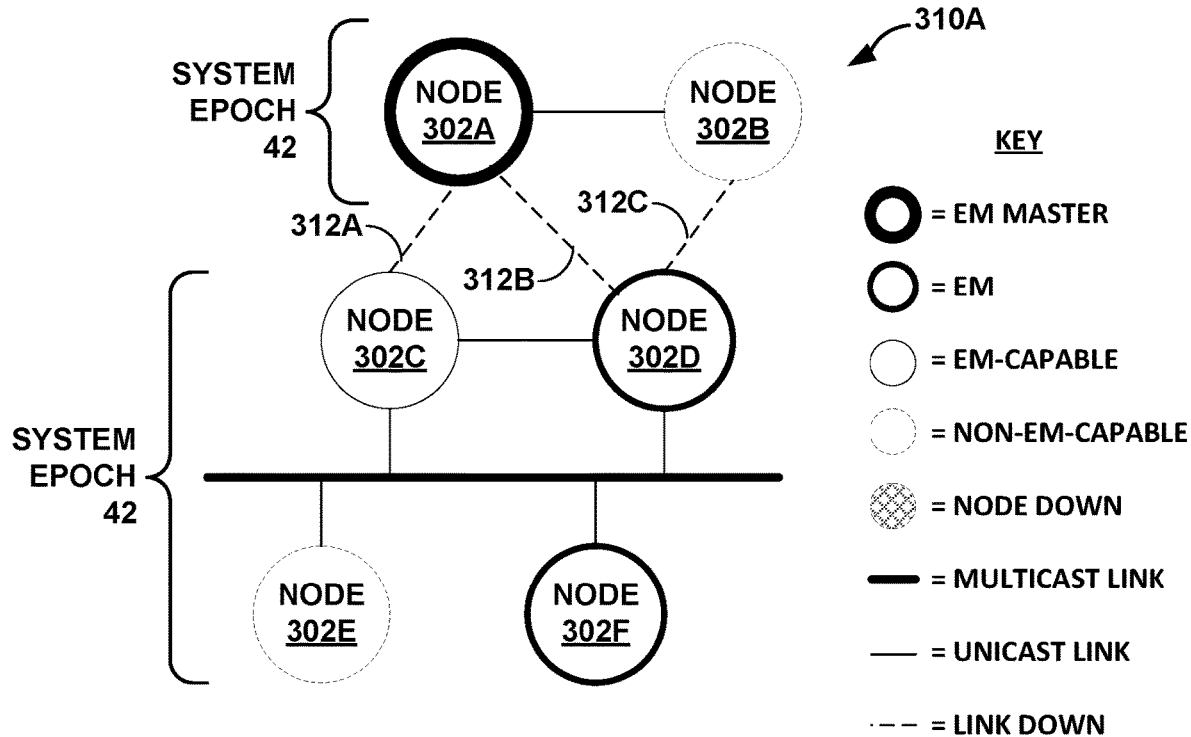
Figure 5B:
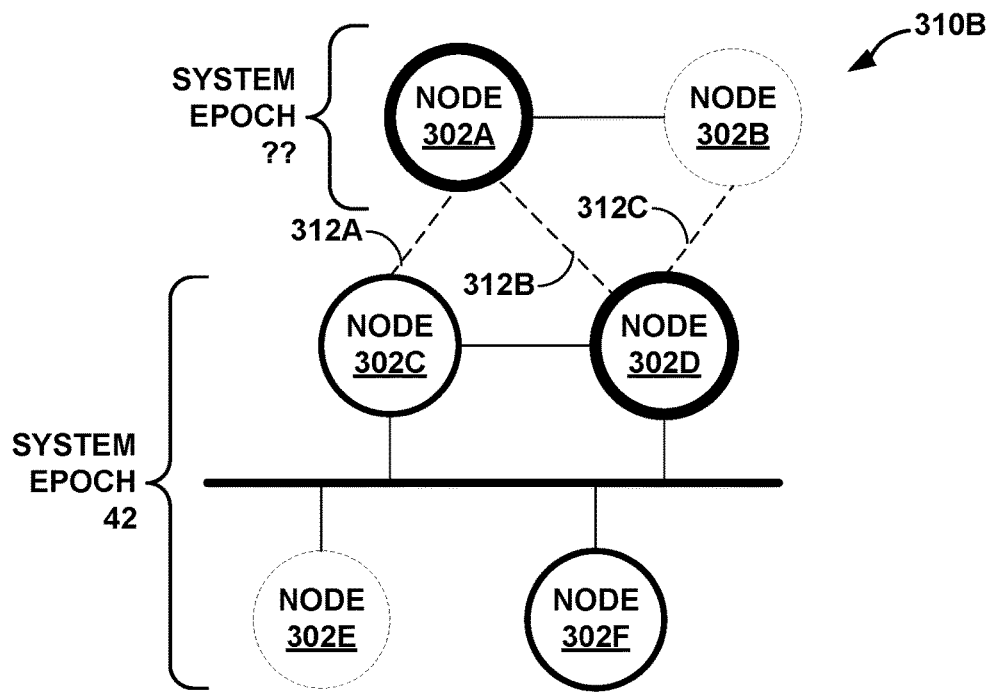
Figure 5C:
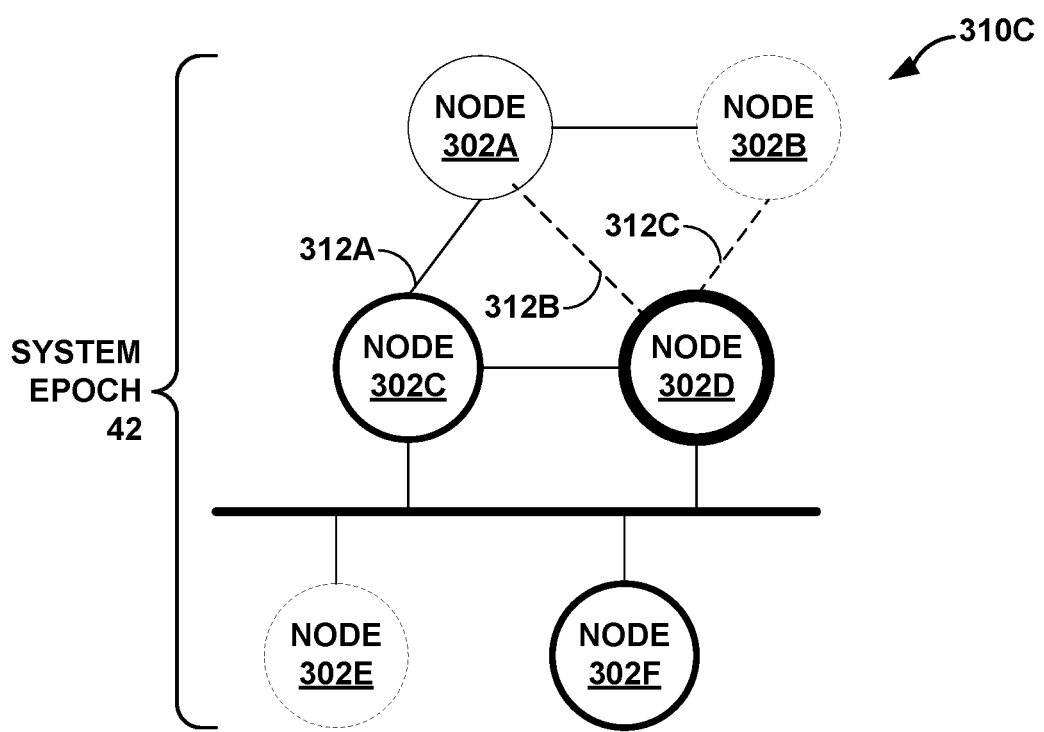

FIGS. 5A-5C are block diagrams illustrating operation of nodes 302 in addressing partition of nodes 302 as a result of failures during execution of the distributed operating system in accordance with various aspects of the techniques described in this disclosure. Each of nodes 302 may be substantially similar to computing node 200 shown in FIG. 3.

In the example of FIG. 5A, distributed operating system 310A has partitioned due to failure of links 312A-312C, resulting in a first partition consisting of nodes 302A and 302B and a second partition of nodes 302C-302F. Each of the first partition and the second partition exist because there is no communication between the first partition and the second partition.

From the perspective of nodes 302C-302F in the second partition, nodes 302A and 302B have failed. At the time of failure the system epoch value was 42, and both the first partition and the second partition continue to execute distributed operating system 310A with a system epoch value of 42. Upon failure, nodes 302A and 302B of the first partition determines that the quorum of epoch managers has been lost, resulting in restarting one or more layers of software stack 11 of nodes 302A and 302B. Nodes 302C-302F of the second partition lose only a single epoch manager (i.e., epoch manager master node 302A in this example) and the quorum of epoch managers is not lost, thereby allowing distributed operating system 310A to continue operation by nodes 302C-302F of the second partition.

FIG. 5B illustrates the result of the restart of the first partition, which cannot reboot and organize because the quorum still does not yet exist due to the failure of links 312A-312C. Node 302A elects itself as epoch manager master, but detects the loss of quorum and therefore cannot functionally participate in execution of distributed operating system 310B (resulting in an inability to assign a system epoch value as the first partition is not functional, where the lack of system epoch value is expressed as "??" in the example of FIG. 5B).

Node 302A stores the epoch manager set (e.g., as a list of node IDs assigned by OFP 14) and the number of nodes in the quorum of epoch managers, maintaining both the epoch manager set and the number of nodes in the quorum through the reset process. As such, node 302A may determine that a single node (i.e., node 302A in the example of FIG. 5B) is insufficient to satisfy the quorum threshold of (N/2)+1, where N is the total number of nodes in the previous quorum. Node 302A may also, even when there are a sufficient number of EM-capable nodes in the first partition, determine that the quorum threshold is not satisfied because the set of epoch managers from the previous quorum would not match the set of EM-capable nodes.

In the second partition, node 302D is elected as the epoch manager master, with node 302F remaining as an epoch manager. Node 302D may reconfigure the epoch manger set using the above described processes to include node 302C, thereby allowing for distributed operating system 310B to remain operational even when one of nodes 302C, 302D, and 302F fails.

In the example of FIG. 5C, link 312A becomes operational, allowing the partitions to merge (or, in other words, "heal"). Once link 312A becomes operational, node 302D remains as the epoch manager master given that node 302A was never an operational epoch manager master given that the quorum threshold was not satisfied in the first partition. Nodes 302C and 302F remain as epoch managers, while node 302A is demoted to EM-capable. Nodes 302 thereby execute distributed operating system 310C, having a system epoch value of 42.

Figure 6A:
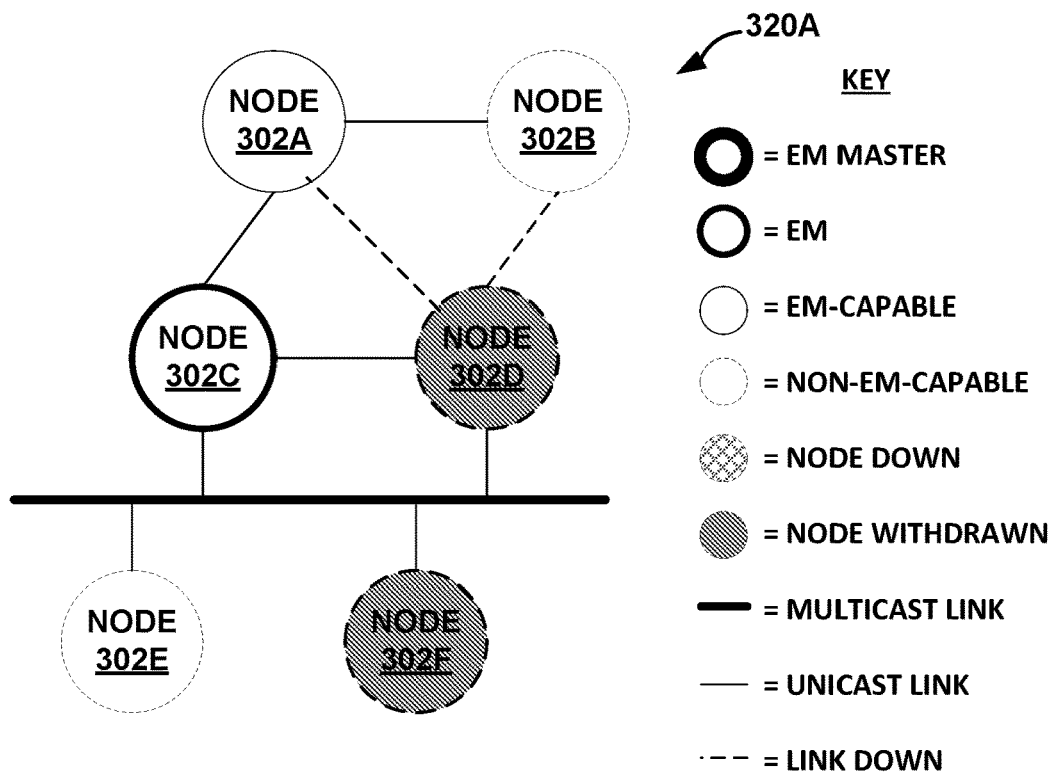
Figure 6B:
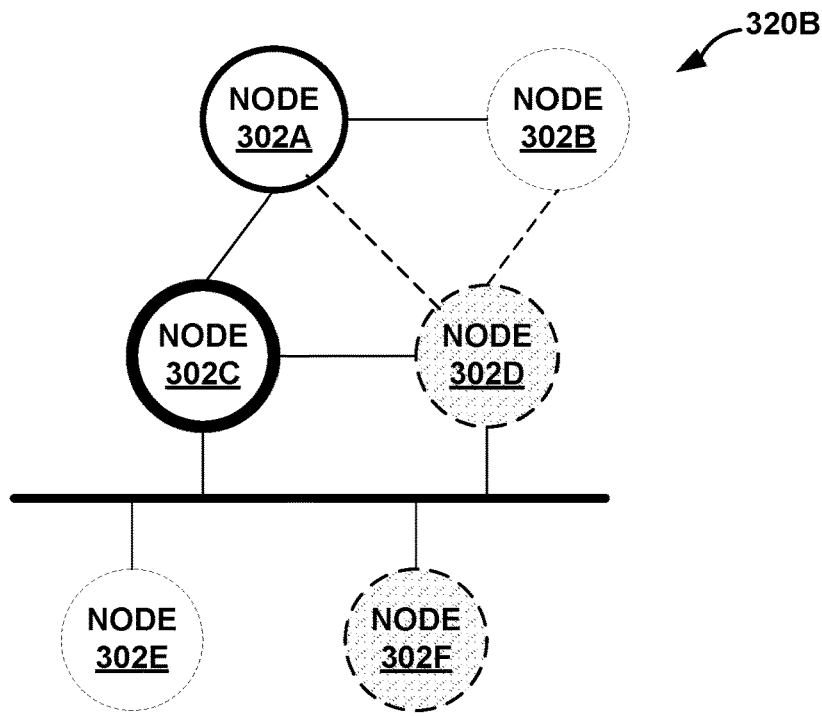

FIGS. 6A and 6B are block diagrams illustrating operation of nodes 302 in addressing controlled shutdown of nodes 302 during execution of the distributed operating system in accordance with various aspects of the techniques described in this disclosure. Again, each of nodes 302 may be substantially similar to computing node 200 shown in FIG. 3.

In some instances, a system administrator may require that one or more of nodes 302 are removed from supporting execution of distributed operating system 310A shown in FIG. 5C. In the example of FIG. 6A, nodes 302D and 302F are withdrawn (or, in other words, removed) from supporting execution of distributed operating system 310A shown in FIG. 5C resulting in distributed operating system 320A. Withdrawing node 302D results in the loss of the epoch manager master, while the withdrawing node 302F results in the loss of an epoch manager. Furthermore, withdrawing two of the three epoch managers (i.e., nodes 302D and 302F in the example of FIG. 6A) would result in loss of the quorum.

To avoid losing the quorum, nodes 302D and 302F issue a request to withdraw the respective EM-capable status prior to being withdrawn. Node 302C may receive the requests, and elect itself as epoch manager master, promoting node 302A as an epoch manager to maintain the quorum (as two nodes meet the quorum threshold of (N/2)+1). In promoting node 302A as an epoch manager, node 302C may reconfigure the epoch manager set to remove node 302D and 302F, thereby allowing nodes 302D and 302F to withdrawn and thereby no longer support operation of distributed operating system 320A, resulting distributed operating system 320B shown in FIG. 6B.

Although shown as taking a single iteration to withdraw one or more of nodes 302, there may be instances where multiple iterations are required to withdraw one or more of nodes 302. Any number of nodes can be withdrawn so long as at least one epoch manager remains between the new set of epoch managers and the old set of epoch managers. The requirement for one epoch manager to remain between the old and new set of epoch mangers is to preserve the IPCB state. Thus, in the instance where all of the epoch managers in the set are to be withdrawn, one epoch manager may remain, forming an intermediate set of epoch managers. Once the intermediate set of epoch managers is formed, the old epoch manager m managing the transition between the old and intermediate set of epoch managers may withdraw to form the new set of epoch managers.

In some examples of single chassis routers includes only one or two routing engines and one or more of forwarding units, which may include, as one example, flexible PIC concentrators (FPCs). The forwarding units may not be EM-capable because the forwarding units may not be capable of running IPCB 18. As such, the systems that have only one or two EM-capable nodes in the routing engines (and thus only one or two IPCB Servers).

The requirement of the IPCB dynamic reconfiguration mechanism that the old and new ensemble memberships overlap by at least one node essentially means that there must be at least three IPCB nodes for the process to be useful (the guy going away, the guy sticking around, and the new guy). Furthermore, IPCB may require at least two nodes to function at all, as that is the smallest possible quorum.

In order to execute in one or two EM-capable node systems, IPCB may operate in a different way on these one or two EM-capable node systems. There may be two issues to modifying IPCB—how to keep IPCB running and consistent, and how to avoid Split Brain when a two-EM-capable node system partitions.

IPCB may execute in two modes, Replicated and Standalone. In Replicated mode, multiple IPCB servers are present and they coordinate with each other (and there must be at least two of them). In Standalone mode, there is only a single IPCB server. IPCB may be restarted in order to switch between the modes.

On single-node systems, IPCB may operate in Standalone mode. There is no redundancy in this system, so it is not particularly problematic in the scheme described in this document—if the sole epoch manager fails, the system also fails.

On two-EM-capable node systems, IPCB may be switched back and forth between Replicated and Standalone modes when one of the EM-capable nodes fails and then recovers. When going from Standalone to Replicated mode, consistency may be guaranteed because there is only one copy of the IPCB state, which is reloaded from the IPCB transaction log on the local file system on the first node, and the second IPCB server receives all state from the first IPCB server. When going from Replicated to Standalone mode, consistency may be guaranteed because a two-EM-capable node system has a IPCB quorum size of two, which may result in the nodes having the latest transaction written to their transaction logs before the transaction is committed. The single IPCB server left after the restart may, in this way, have all transactions.

When a two-EM-capable node system becomes partitioned, the split brain situation described in more detail below could occur (where both sides would come up in Standalone mode). However, two-EM-capable systems have mastership hardware, an FPGA that designates one node or the other as master. The mastership hardware may be leveraged, and the quorum rules may be adjusted in the two-EM-capable node system to define when a quorum is present to be only when one node is reachable and that node has hardware mastership. This quorum rule adjustment solves the split brain situation because only one of the two nodes will be master, and the other will not have quorum and will thus restart and stay down until the partitions merge.

Figure 7A:
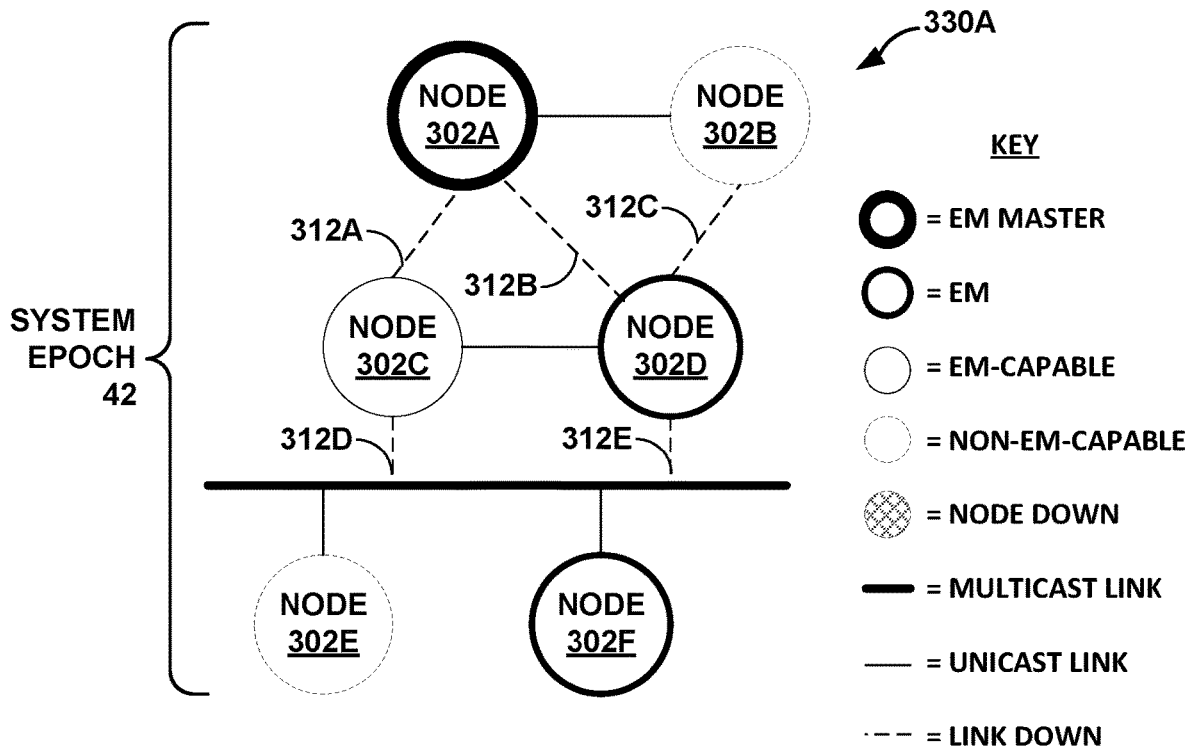
Figure 7B:
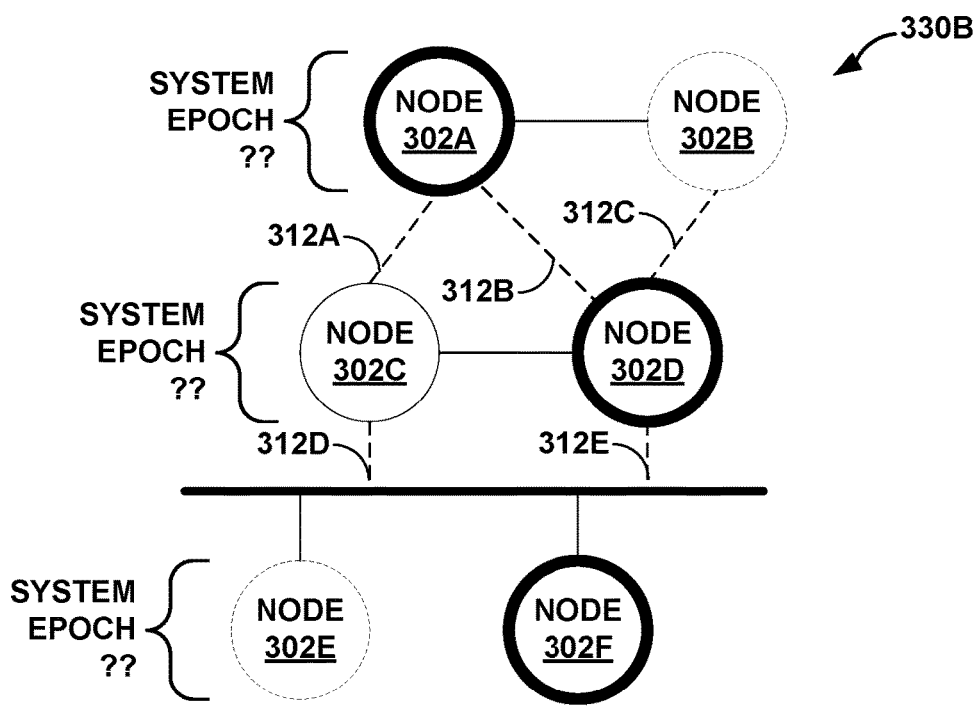
Figure 7C:
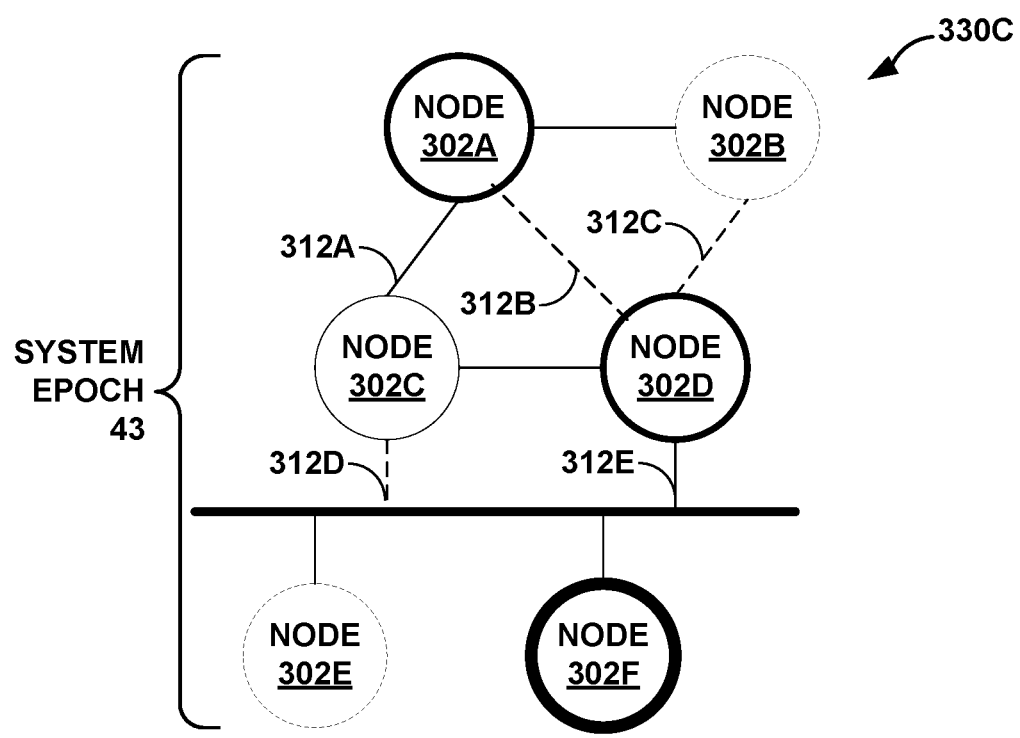

FIGS. 7A-7C are block diagrams illustrating operation of nodes 302 in addressing multiple partitions of nodes 302 as a result of failures during execution of the distributed operating system in accordance with various aspects of the techniques described in this disclosure. Each of nodes 302 may be substantially similar to computing node 200 shown in FIG. 3.

In the example of FIG. 7A, links 312A-312E all fail, resulting in three partitions. The first partition includes node 302A and 302B. Node 302A elects itself as the epoch manager master, but cannot reestablish the quorum as there are insufficient epoch managers of the old epoch manager set in the first partition to satisfy the quorum threshold of (N/2)+1.

The second partition includes nodes 302C and 302D. Prior to the failure of links 312A-312E, node 302D was an epoch manager. Node 302D may elect itself as epoch manager master, but is unable to maintain the quorum as two of the three epoch manager nodes from the previous quorum (i.e., nodes 302A and 302F in the example of FIG. 7A) are unavailable.

The third partition includes nodes 302E and 302F. Prior to the failure of links 312A-312E, node 302F was an epoch manager. Node 302F may elect itself as epoch manager master, but is unable to maintain the quorum as two of the three epoch manager nodes from the previous quorum (i.e., nodes 302A and 302D in the example of FIG. 7A) are unavailable.

As such, distributed operating system 330B shown in FIG. 7B results in which none of the three partitions are able to execute distributed operating system 330B. Because none of nodes 302 are able to execute distributed operating system 330B, the system epoch value for each of the partitions is unknown (as denoted by the "??" in FIG. 7B). The epoch manager masters of each partition (i.e., nodes 302A, 302D, and 302F in the example of FIG. 7B) wait until one or more of links 312A-312E become operational to reform the quorum and continue execution of the distributed operating system.

In the example of FIG. 7C, the partitions have merged as a result of links 312A and 312E becoming operational. Nodes 302 negotiate which of the previous epoch manager masters will remain master (e.g., by way of the EM master priority discussed above). Node 302F remains as epoch manager master in the example of FIG. 7C with node 302D and 302A executing as epoch managers. As such, nodes 302 exchange state information to regain coherency, and update to a system epoch value of 43 (from 42 as shown in the example of FIG. 7A). Nodes 302 may collectively execute distributed operating system 330C with a system epoch value of 43 (to distinguish from the version identified by the system epoch value of 42).

Figure 8A:
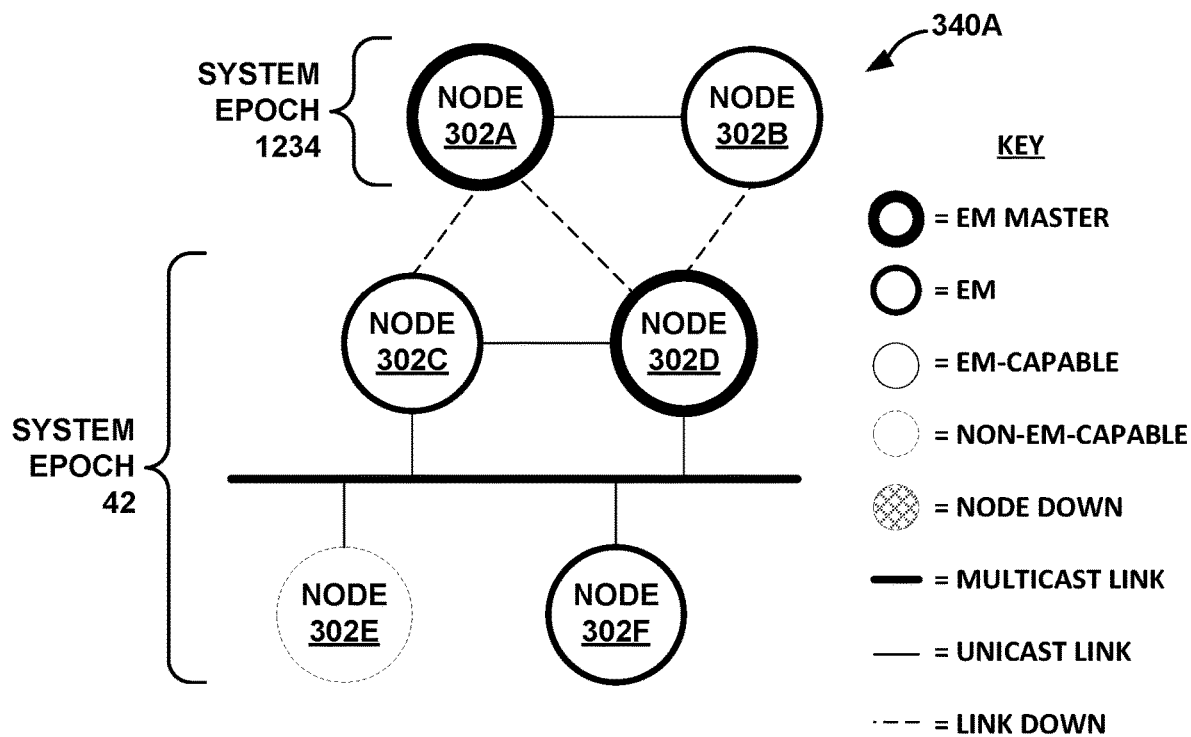
Figure 8B:
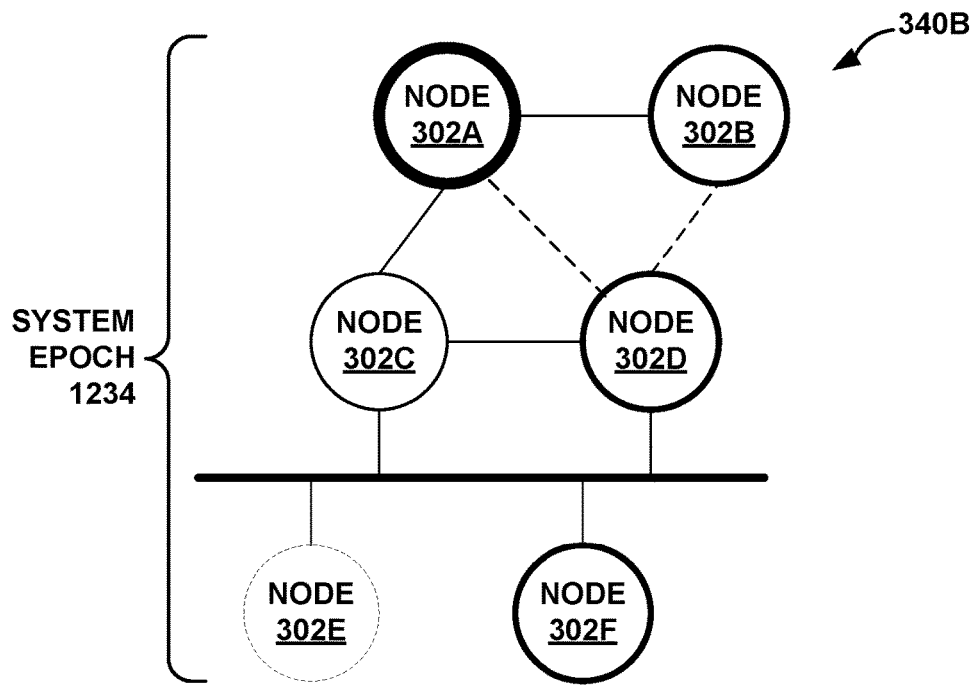

FIGS. 8A and 8B are block diagrams illustrating operation of nodes 302 in addressing "split brain" situations as a result of failures during execution of the distributed operating system in accordance with various aspects of the techniques described in this disclosure. Each of nodes 302 may be substantially similar to computing node 200 shown in FIG. 3.

Split brain situations refer to situations in which a system divides into two or more partitions where at least two of the partitions remain operational as a result of not being aware that the other partition is still operational resulting in a divided or split execution environment (or, in other words, "brain"). In normal operation where distributed operating system has previously executed, split brain situations are avoided by the quorum system regulated by the quorum threshold and the previous set of epoch managers as discussed above.

Split brain situations may occur when a system/device is started with no previous state (e.g., in particular, no set quorum size and/or threshold) and the nodes of the device are partitioned. In the example of FIG. 8A, nodes 302 are partitioned into two partitions due to link failures, where the first partition includes nodes 302A and 302B, and the second partition includes nodes 302C-302F. Node 302A is elected as the epoch manager master of the first partition, and designates node 302B as an epoch manager for the first partition. Node 302D is elected as the epoch manager master for the second partition, and designates each of nodes 302C and 302F as epoch managers.

In this split brain situation, the first partition of distributed operating system 340A may select a system epoch value of 1234, while the second partition of distributed operating system 340A selects a system epoch value of 42. Considering that the system epoch value denotes a version of distributed operating system 340A and allows for proper synchronization between different versions of distributed operating system 340A, the selection of system epoch values during initial boot of distributed operating system 340A is random so as to avoid two partitions selecting the same system epoch value as that would impact synchronization between different nodes.

Assuming that one of the links becomes operations as shown in the example of FIG. 8B, the two partitions of distributed operating system 340B merge. SysEpochMan 16 utilizes a preference mechanism (described above) to determine which epoch to preserve and which to discard, in order to avoid restarting the most recent version (or "best") version after the partitions merge.

Figure 9:
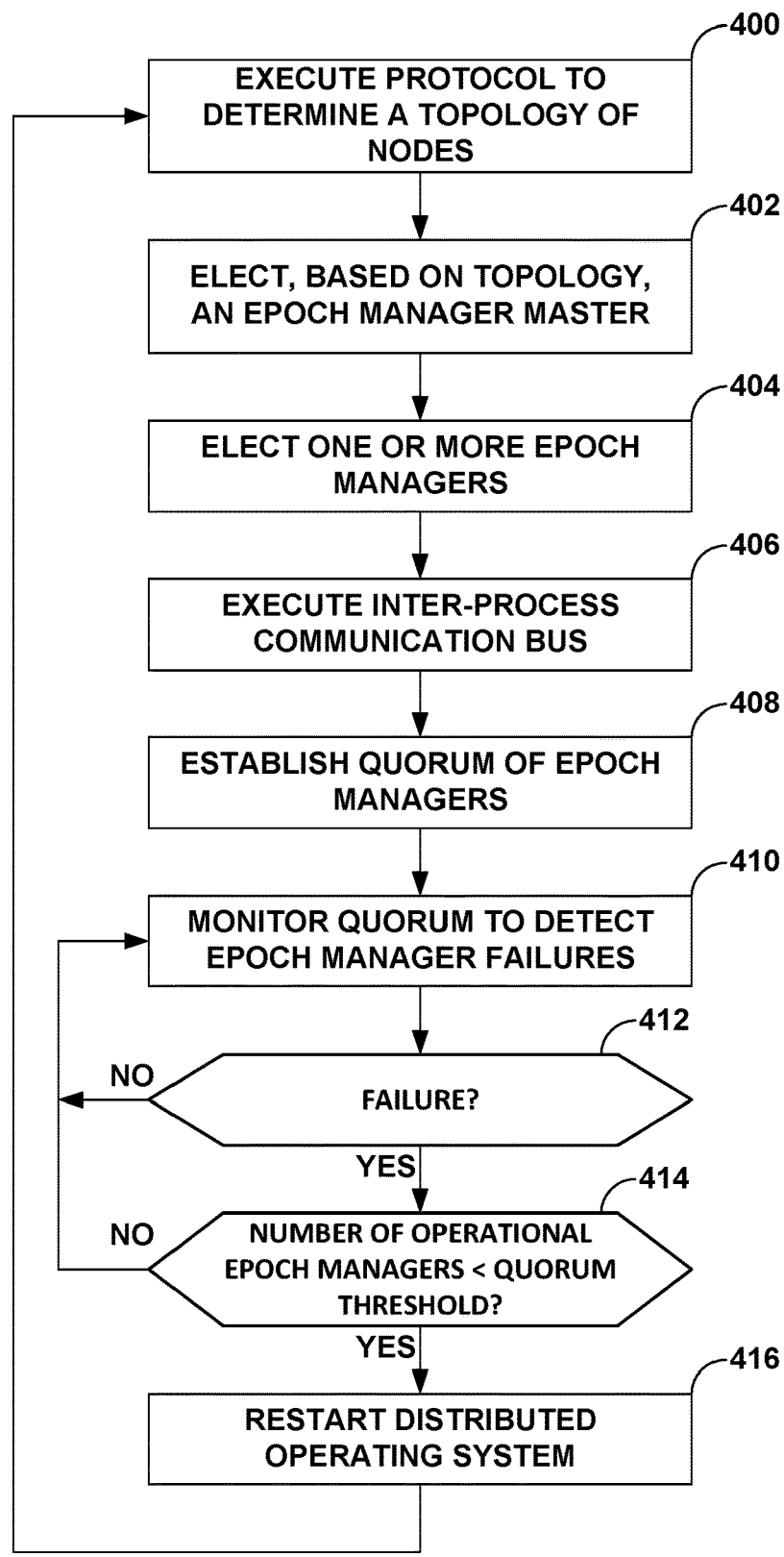
FIG. 9 is a flowchart illustrating exemplary operation of the node of the multi-chassis router shown in FIG. 3 in performing various aspects of the distributed operating system techniques described in this disclosure.

FIG. 9 is a flowchart illustrating exemplary operation of the node of the multi-chassis router shown in FIG. 3 in performing various aspects of the distributed operating system techniques described in this disclosure. As described above, computing node 200 initially executes OFP 14 to determine a topology of nodes that allows for coalescence and execution by the nodes of the single instance of distributed operating system 10 (400). OFP physical topology discovery may occur in a manner similar to that of link state protocols. OFP 14 constructs the graph data structure representative of the topology of primary and secondary nodes interconnected with one another by the links based on the announcements.

Next, computing node 200 may execute SysEpochMan 16, which may, based on the graph data structure representative of the topology of primary and secondary nodes, elect an epoch manager master from among those nodes configured to execute as epoch managers (402). The elected epoch manager master may elect one or more of the epoch managers (including the elected epoch manager master) to act as epoch managers (404). Each of the epoch managers may then execute IPCB 18 (404).

IPCB 18 forms a network of servers and clients. The servers may be referred to as an IPCB ensemble. IPCB 18 may establish a quorum of epoch managers in which a majority of servers (e.g., more than (N/2)+1, where N represents the number of servers/epoch managers) are connected and functioning for IPCB 18 to continue successful operation of distributed operating system 10 (408). In this way, the techniques may allow for separate (or in other words individual) compute nodes to coalesce for purposes of executing distributed operating system 10.

After forming the quorum and establishing IPCB 18 by which the clients may interface with the shared file system, IPCB 18 may monitor the IPCB servers (which is another way to refer to epoch managers) to detect epoch manager failures (e.g., as measured by whether connectivity between one or more of the plurality of nodes has failed) (410). When no connectivity failures occurs ("NO" 412), IPCB 18 continues to monitor the quorum to detect epoch manager failures (410).

When an IPCB epoch manager fails or a link fails (which may be generally referred to as a "connectivity failure") ("YES" 412), the remaining IPCB epoch managers may determine whether the quorum of epoch managers exists. The remaining IPCB epoch manager may determine whether the quorum of epoch managers exists by comparing the number of operational epoch managers (denoted by the variable "N") is less than a quorum threshold (e.g., (N/2)+1) (414).

When the number of operational epoch managers is less than the quorum threshold ("YES" 414), the remaining epoch managers may restart distributed operating system 10 (which may not require restarting multi-chassis router 4 or kernel 12, but only restarting one or more of those layers above kernel 12 in software stack 11, such as OFP 14, SysEpochMan 16, IPCB 18, SysMan 20, and/or distributor 22) (416). Upon restarting, the process starts again with execution of the protocol to determine the topology of nodes, etc. (400-410). When the number of operational epoch managers is greater than or equal to the quorum threshold ("NO" 414), the remaining epoch managers may maintain the quorum and continue operating (monitoring the quorum to detect epoch manager failures —410), potentially adding to the quorum new epoch managers that were not elected as epoch managers during the formation of the quorum.

Figure 10:
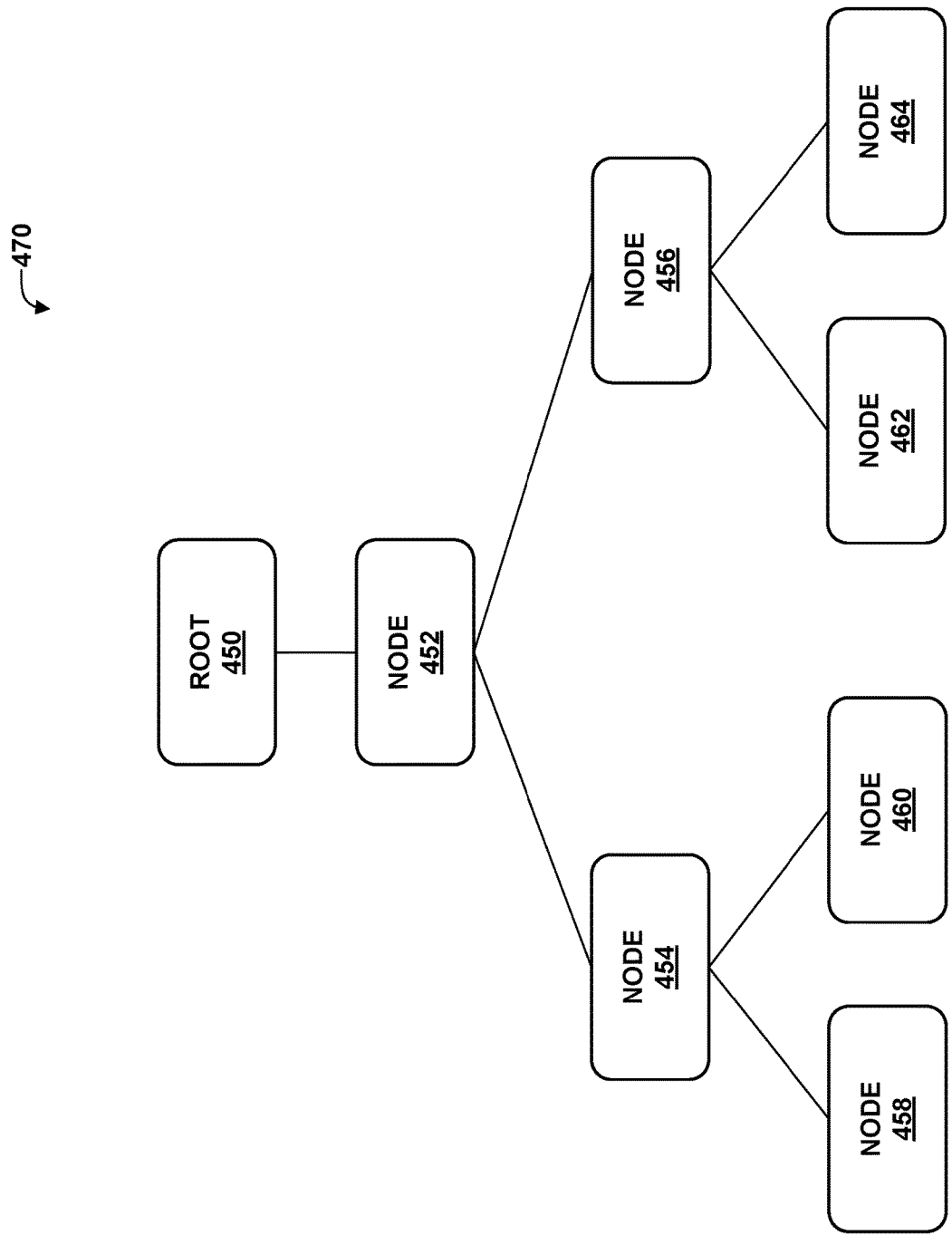
FIG. 10 is a conceptual diagram illustrating an example tree data structure for storing state information in accordance with techniques of this disclosure.

FIG. 10 is a conceptual diagram illustrating an example tree data structure 470 for storing state information in accordance with techniques of this disclosure. In this example, tree data structure 470 includes root tree node 450 and tree nodes 452-464. Each of tree nodes 452-464 includes a prefix value and a digest value. In this example, the prefix value of tree node 452 may be XX/104, the prefix value of tree node 454 may be XXX/108, the prefix value of tree node 456 may be XXY/108, the prefix value of tree node 458 may be XXXX/112, the prefix value of tree node 460 may be XXXY/112, the prefix value of tree node 462 may be XXYX/112, and the prefix value of tree node 464 may be XXYY/112. In this example, tree nodes 458-464 are leaf tree nodes of tree data structure 470, because tree nodes 458-464 do not have any child tree nodes.

Each of the tree nodes of tree data structure 470 also includes a digest value. In general, each digest value represents all fragments in the blocks they represent. Thus, root 450 includes digests that represent all messages in tree data structure 470. The digest for tree node 454 covers message fragments of tree nodes 454, 458, and 460, while the digest for tree node 456 covers message fragments of tree nodes 464, 464. To determine whether two tree data structures, such as tree data structure 470, are the same, the digests of tree node 452 and a corresponding tree node of a different tree data structure being compared to tree data structure 470 can be compared, and if each of these digests matches between the tree data structures, the tree data structures can be said to be the same, and therefore, are synchronized.

If two such tree data structures are not synchronized, a node, such as computing node 200 of FIG. 3, may recursively walk tree data structure 470 to determine which of tree nodes 452-464 is to be updated. Computing node 200 may start at tree node 452 and walk tree data structure 470 down to the leaf tree nodes, i.e., tree nodes 458-464. Computing node 200 may then compare each of the leaf tree nodes 458-464 to the corresponding leaf tree nodes of the other tree data structure. For each leaf tree node that does not match, computing node 200 may exchange messages with another node of distributed operating system 10 that is storing the other tree data structure to synchronize the corresponding tree nodes of the tree data structure, as discussed above.

Figure 11:
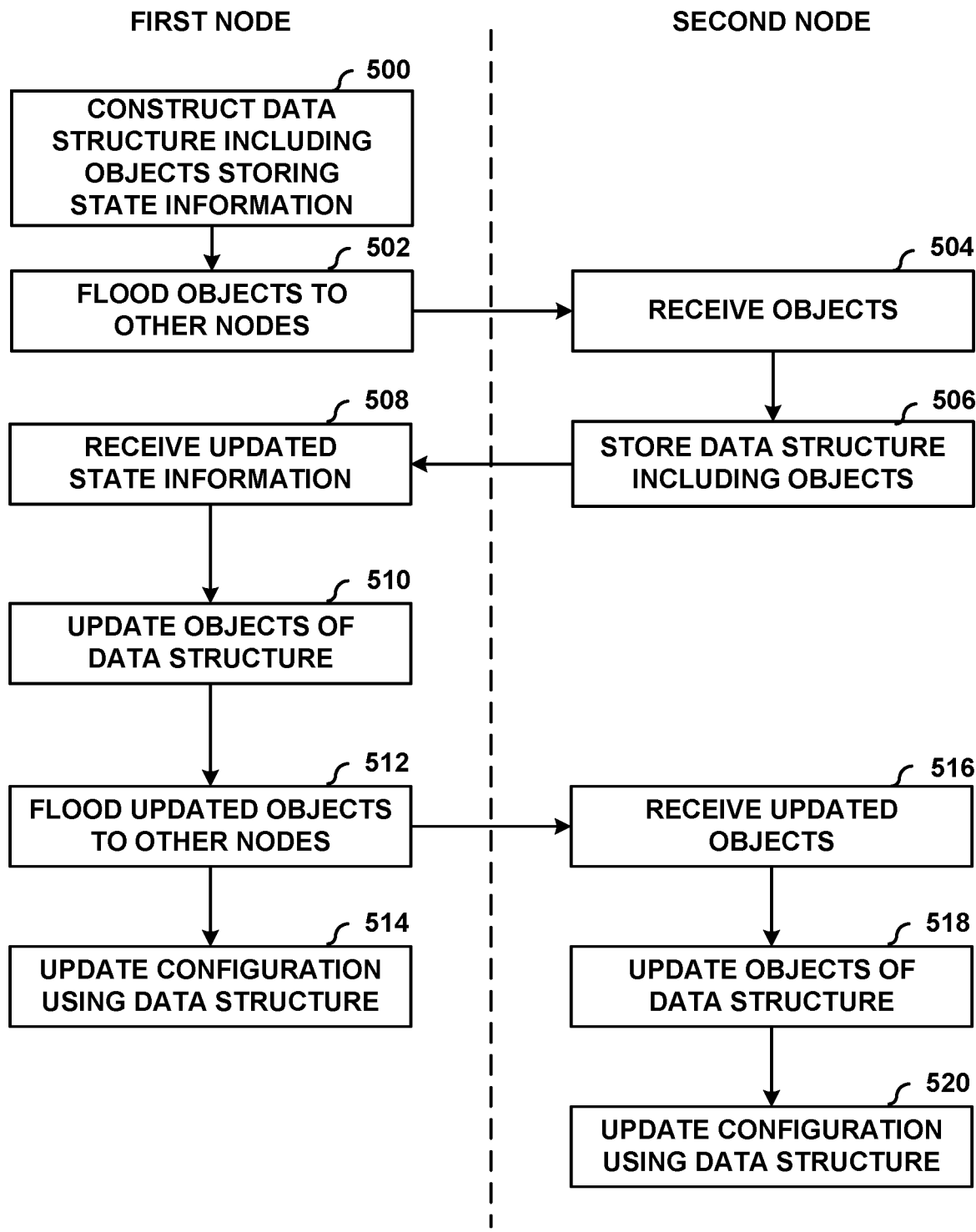
FIG. 11 is a flowchart illustrating an example method for synchronizing state information between different instances of a distributed operating system executed by respective computing nodes of a network device in accordance with the techniques of this disclosure.

FIG. 11 is a flowchart illustrating an example method for synchronizing state information between different instances of a distributed operating system executed by respective computing nodes of a network device in accordance with the techniques of this disclosure. In this example, two nodes are described, although it should be understood that additional nodes may perform a substantially similar method. The nodes may each include components similar to those discussed with respect to computing node 200 of FIG. 3.

In this example, a first node initially constructs a data structure including a plurality of objects, each of the objects storing state information (500). The data structure may be a tree data structure as discussed above. Thus, construction of the tree data structure may further involve calculating digests for leaf tree nodes of the tree data structure, as well as digests for non-leaf tree nodes of the tree data structure. The digests for the non-leaf tree nodes may represent data for the corresponding tree nodes and tree nodes accessible by the corresponding tree nodes (e.g., child tree nodes down to the leaf tree nodes). The state information may be, for example, state information for the distributed operating system itself, and/or for one or more applications executed in an application space provided by the distributed operating system. The objects may represent messages or message fragments, as discussed above. Furthermore, the objects may be distributable according to the object flooding protocol (OFP), as also discussed above. Accordingly, the first node floods the objects to other computing nodes of the network device (502), e.g., in accordance with OFP. Accordingly, a second node in this example receives the objects (504) and stores a data structure including the objects (506).

Subsequently, the first node receives updated state information (508). For example, the first node may receive updated state information for one of the applications or for the distributed operating system. In response, the first node updates relevant objects of the data structure (510), i.e., the objects corresponding to the updated state information, to store the updated state information. When updating the objects of the data structure, the first node may also update a logical clock value associated with the objects of the data structure, to represent a time at which the objects of the data structure were updated. As discussed above, assuming the data structure is a tree data structure, the first node may update a tree node of the tree data structure corresponding to the updated state information, as well as digests for each tree node of the tree data structure between the root tree node and the hierarchically lowest tree node impacted by the updated state information.

Moreover, after updating the data structure, the first node floods the updated objects (messages or message fragments) to other computing nodes of the network device (512), e.g., according to OFP. The first node also updates its configuration using the updated data structure. For example, assuming the data structures are tree data structures, the first and second computing nodes of the network device may compare digests of corresponding tree nodes of the tree data structures to determine whether the corresponding tree nodes of the tree data structures match (that is, have equal digests). For each tree node of the tree data structures that do not have matching digests, the first node (which is assumed to have a more up to date version of the state information in this example) floods object data (i.e., the message fragment of the tree node) to the second node. More generally, the first and second computing nodes of the network device (and any other computing nodes of the network device) may compare logical clock values for the corresponding tree nodes of the tree data structures to determine which tree data structure has a most current version of the tree node of the tree data structures, and then the computing node of the network device having the most up to date tree node of the tree data structures floods the object for the tree node of the tree data structure to the other computing nodes of the network device.

In response to receiving the flooded objects from the first node (516), the second node also updates objects of its data structure (518) in a manner similar to the first node, and updates its configuration using the updated data structure as well (520).

In this manner, the method of FIG. 11 represents an example of a method including receiving, by a first computing node of a network device that executes a first instance of a distributed operating system, updated state information for at least one of the distributed operating system or an application executed in an application space provided by the distributed operating system, updating, by the first computing node of the network device, a local data structure of the first computing node of the network device to include the updated state information, the local data structure storing a plurality of objects, each of the objects defining a portion of state information for at least one of the distributed operating system or the application, and synchronizing, by the first computing node of the network device, the updated local data structure with a remote data structure of a second instance of the distributed operating system executed by a second computing node of the network device.

Although in FIG. 11 only the first computing node of the network device is shown as receiving updated state information, it should be understood that in other examples, other computing nodes of the network device may receive updated state information and flood corresponding objects to the first node. For example, the second node discussed with respect to FIG. 11 may receive updated state information, update its data structure to include the updated state information, and then flood objects representing the updated state information to the first computing node of the network device. As noted above, in general, each computing node of the network device compares digests of tree nodes of respective tree data structures to determine whether the tree nodes of the tree data structures match. When digests of corresponding tree nodes of the tree data structures do not match, the computing nodes of the network device may compare logical clock values associated with the tree nodes of the tree data structures to determine which tree data structure includes the most up to date tree node of the tree data structure. The computing node of the network device having the most up to date tree node of the tree data structure floods data for the tree node of the tree data structure to the other computing nodes of the network device.

One or more of the techniques described herein may be partially or wholly executed in software. For example, a computer-readable medium may store or otherwise comprise computer-readable instruction, i.e., program code that can be executed by a processor to carry out one or more of the techniques described above. For example, the computer-readable medium may comprise random access memory (RAM), read-only memory (ROM), non-volatile random access memory (NVRAM), electrically erasable programmable read-only memory (EEPROM), flash memory, magnetic or optical media, or the like.

Various embodiments of the invention have been described. Although described in reference to a multi-chassis router, which each chassis including a plurality of routing engines, the techniques may be applied to any multi-chassis device having a plurality of control nodes in at least one chassis. Examples of other devices include switches, gateways, intelligent hubs, firewalls, workstations, file servers, database servers, and computing devices generally. Furthermore, the described embodiments refer to hierarchically-ordered and temporally-linked data structures, but other embodiments may use different data structures. These and other embodiments are within the scope of the following claims.

What is claimed is:

1. A device comprising:
a plurality of hardware computing nodes configured to:
execute a protocol by which to discover a topology of the plurality of hardware computing nodes;
determine, based on the topology, a subset of the plurality of hardware computing nodes to manage execution of a distributed operating system, wherein the determined subset of the plurality of hardware computing nodes are further configured to execute a communication bus by which to synchronize operating system state information between the subset of the plurality of hardware computing nodes; and
execute, based on the operating system state information, the distributed operating system to provide an execution environment in which one or more applications execute,
wherein the plurality of hardware computing nodes are configured to exchange announcements between the plurality of hardware computing nodes, the announcements indicating whether each of the plurality of hardware computing nodes are capable of executing as a manager hardware computing node, the manager hardware computing node configured to manage execution of the distributed operating system;
wherein the determined subset of the plurality of hardware computing nodes are further configured to elect one of the determined subset of the plurality of hardware computing nodes as a manager master hardware computing node,
wherein the manager master hardware computing node designates each of one or more of the subset of the plurality of hardware computing nodes as a manager hardware computing nodes, and
wherein the one or more manager hardware computing nodes form a quorum in which operating system state information pertinent to the execution of the distributed operating system is synchronized between the one or more manager hardware computing nodes.

2. The device of claim 1,
wherein the manager master hardware computing node is further configured to:
determine whether connectivity between one or more of the manager hardware computing nodes has failed;
determine whether a number of remaining manager hardware computing nodes exceeds a quorum threshold; and
restart, when a number of remaining manager hardware computing nodes is less than the quorum threshold, the distributed operating system.

3. The device of claim 2, wherein the manager master hardware computing node is further configured to:
set an epoch value to denote a current version of the distributed operating system; and
increment, after restarting the distributed operating system, the epoch value by one so that the plurality of hardware computing nodes avoid executing two different versions of the distributed operating system.

4. The device of claim 2, wherein the quorum threshold is equal to a number of the manager hardware computing nodes participating in the quorum divided by two plus one ((N/2)+1), where N denotes the number of the manager hardware computing nodes participating in the quorum.

5. The device of claim 2, wherein the manager hardware computing nodes execute, when the number of remaining manager hardware computing nodes exceed the quorum threshold, the distributed operating system at a current version.

6. The device of claim 2, wherein the manager hardware computing nodes are further configured to elect one of the manager hardware computing nodes as a system manager master hardware computing node,
wherein the system master hardware computing node indicates which of the plurality of hardware computing nodes are to execute the one or more applications; and
wherein the indicated ones of the plurality of hardware computing nodes execute the one or more applications.

7. The device of claim 1,
wherein the device comprising a multi-chassis router having multiple chassis housing the plurality of hardware computing nodes, and
wherein the plurality of hardware computing nodes comprises a master routing engine, one or more local routing engines, and one or more forwarding units.

8. A method comprising:
executing, by a plurality of hardware computing nodes, a protocol by which to discover a topology of the plurality of hardware computing nodes;
determining, by at least one of the plurality of hardware computing nodes and based on the topology, a subset of the plurality of hardware computing nodes to manage execution of a distributed operating system,
executing, by the determined subset of the plurality of hardware computing nodes, a communication bus by which to synchronize operating system state information between the subset of the plurality of hardware computing nodes;

executing, by the plurality of hardware computing nodes and based on the operating system state information, the distributed operating system to provide an execution environment in which one or more applications execute, wherein executing the protocol comprises exchanging announcements between the plurality of hardware computing nodes, the announcements indicating whether each of the plurality of hardware computing nodes are capable of executing as a manager hardware computing node, and wherein the determined subset of the plurality of hardware computing nodes are further configured to elect one of the determined subset of the plurality of hardware computing nodes as a manager master hardware computing node, and wherein the method further comprises:

designating, by the manager master hardware computing node, each of one or more of the subset of the plurality of hardware computing nodes as a manager hardware computing node;

forming, by the one or more manager hardware computing nodes, a quorum in which operating system state information pertinent to the execution of the distributed operating system is synchronized between the one or more manager hardware computing nodes; and managing, by the manager hardware computing node, execution of the distributed operating system.

9. The method of claim 8, further comprising:

determining, by the manager master hardware computing node, whether connectivity between one or more of the manager hardware computing nodes has failed;

determining, by the manager master hardware computing node, whether a number of remaining manager hardware computing nodes exceeds a quorum threshold; and restarting, by the manager master hardware computing node, when a number of remaining manager hardware computing nodes is less than the quorum threshold, the distributed operating system.

10. The method of claim 9, further comprising:

setting, by the manager master hardware computing node, an epoch value to denote a current version of the distributed operating system; and incrementing, by the manager master hardware computing node, after restarting the distributed operating system, the epoch value by one so that the plurality of hardware computing nodes avoid executing two different versions of the distributed operating system.

11. The method of claim 9, wherein the quorum threshold is equal to a number of the manager hardware computing nodes participating in the quorum divided by two plus one ((N/2)+1), where N denotes the number of the manager hardware computing nodes participating in the quorum.

12. The method of claim 9, further comprising executing, by the manager master hardware computing node, when the number of remaining manager hardware computing nodes exceed the quorum threshold, the distributed operating system at a current version.

13. The method of claim 9, further comprising:

electing, by the manager hardware computing nodes, one of the manager hardware computing nodes as a system manager master hardware computing node, indicating, by the system master hardware computing node, which of the plurality of hardware computing nodes are to execute the one or more applications; and executing, by the indicated ones of the plurality of hardware computing nodes, the one or more applications.

14. The method of claim 8, wherein a device comprising a multi-chassis router having multiple chassis housing the plurality of hardware computing nodes, and wherein the plurality of hardware computing nodes comprises a master routing engine, one or more local routing engines, and one or more forwarding units.

15. A non-transitory computer-readable storage medium having stored thereon instructions that, when executed, cause one or more of a plurality of hardware computing nodes to:

execute a protocol by which to discover a topology of the plurality of hardware computing nodes;

determine, based on the topology, a subset of the plurality of hardware computing nodes to manage execution of a distributed operating system;

execute a communication bus by which to synchronize operating system state information between the subset of the plurality of hardware computing nodes;

execute, based on the operating system state information, the distributed operating system to provide an execution environment in which one or more applications execute;

exchange announcements between the plurality of hardware computing nodes in accordance with the protocol, the announcements indicating whether each of the plurality of hardware computing nodes are capable of executing as a manager hardware computing node;

manage, by the manager hardware computing node, execution of the distributed operating system; and elect one of the determined subset of the plurality of hardware computing nodes as a manager master hardware computing node, wherein the manager master hardware computing node designates each of one or more of the subset of the plurality of hardware computing nodes as a manager hardware computing nodes, and wherein the one or more manager hardware computing nodes form a quorum in which operating system state information pertinent to the execution of the distributed operating system is synchronized between the one or more manager hardware computing nodes.

16. The non-transitory computer-readable storage medium of claim 15, wherein the manager master hardware computing node:

determines whether connectivity between one or more of the manager hardware computing nodes has failed;

determines whether a number of remaining manager hardware computing nodes exceeds a quorum threshold; and restarts, when a number of remaining manager hardware computing nodes is less than the quorum threshold, the distributed operating system.

17. The non-transitory computer-readable storage medium of claim 16, wherein the manager master hardware computing node: sets an epoch value to denote a current version of the distributed operating system; and increments, after restarting the distributed operating system, the epoch value by one so that the plurality of hardware computing nodes avoid executing two different versions of the distributed operating system.

* * * * *